United States Patent [19]
Tanaka et al.

[11] Patent Number: 5,608,493
[45] Date of Patent: Mar. 4, 1997

[54] IMAGE FORMING APPARATUS CAPABLE OF SETTING AN OPERATIONAL MODE BY READING IMAGE OF A PREDETERMINED FORMAT

[75] Inventors: Tomoki Tanaka, Yamatokoriyama; Hiroyuki Ataka, Nara; Yoichi Iwasaki, Yamatokoriyama, all of Japan

[73] Assignee: Sharp Kabushiki Kaisha, Osaka, Japan

[21] Appl. No.: 462,879

[22] Filed: Jun. 5, 1995

[30] Foreign Application Priority Data

Jun. 7, 1994 [JP] Japan ................... 6-125321

[51] Int. Cl.⁶ ................................. G03G 15/00
[52] U.S. Cl. ....................... 399/83; 382/317; 399/367
[58] Field of Search ................... 355/200, 201, 355/202, 209, 313, 314; 358/448, 450, 452; 382/317

[56] References Cited

U.S. PATENT DOCUMENTS

| | | | |
|---|---|---|---|
| 4,757,348 | 7/1988 | Rourke et al. | 355/200 X |
| 5,161,037 | 11/1992 | Saito | 355/200 X |
| 5,235,396 | 8/1993 | Ito et al. | 355/313 |
| 5,243,381 | 9/1993 | Hube . | |
| 5,438,430 | 8/1995 | Mackinlay et al. | 358/450 |

FOREIGN PATENT DOCUMENTS

| | | |
|---|---|---|
| 0461671 | 12/1991 | European Pat. Off. . |
| 63-221358 | 9/1988 | Japan .................... 355/200 |
| 4-304762 | 10/1992 | Japan . |
| 5-63868 | 3/1993 | Japan . |
| 5-112064 | 5/1993 | Japan . |

*Primary Examiner*—Joan H. Pendegrass

[57] ABSTRACT

An image forming apparatus outputs an operation setting paper sheet (Op-sheet) having printed thereon an operation setting image (template) stored in a data ROM upon operating an operation setting paper sheet output key (OPS key). The image forming apparatus reads the operation setting image on the operation setting paper sheet by a scanner, and sets an operational mode according to selection items in the read image, thereby performing an image forming operation according to the operational mode. By producing a print output of the operation setting image, the operation setting paper sheet in the original form without having a deterioration of the image quality or displacement can be provided with the unique image quality of this image forming apparatus which enables the image to be surely read by the image forming apparatus. Therefore, compared with the case of adopting the conventional operational setting paper sheet to be prepared by repetitively copying the original sheet, an occurrence of reading errors can be suppressed, thereby surely preventing an operation error.

32 Claims, 14 Drawing Sheets

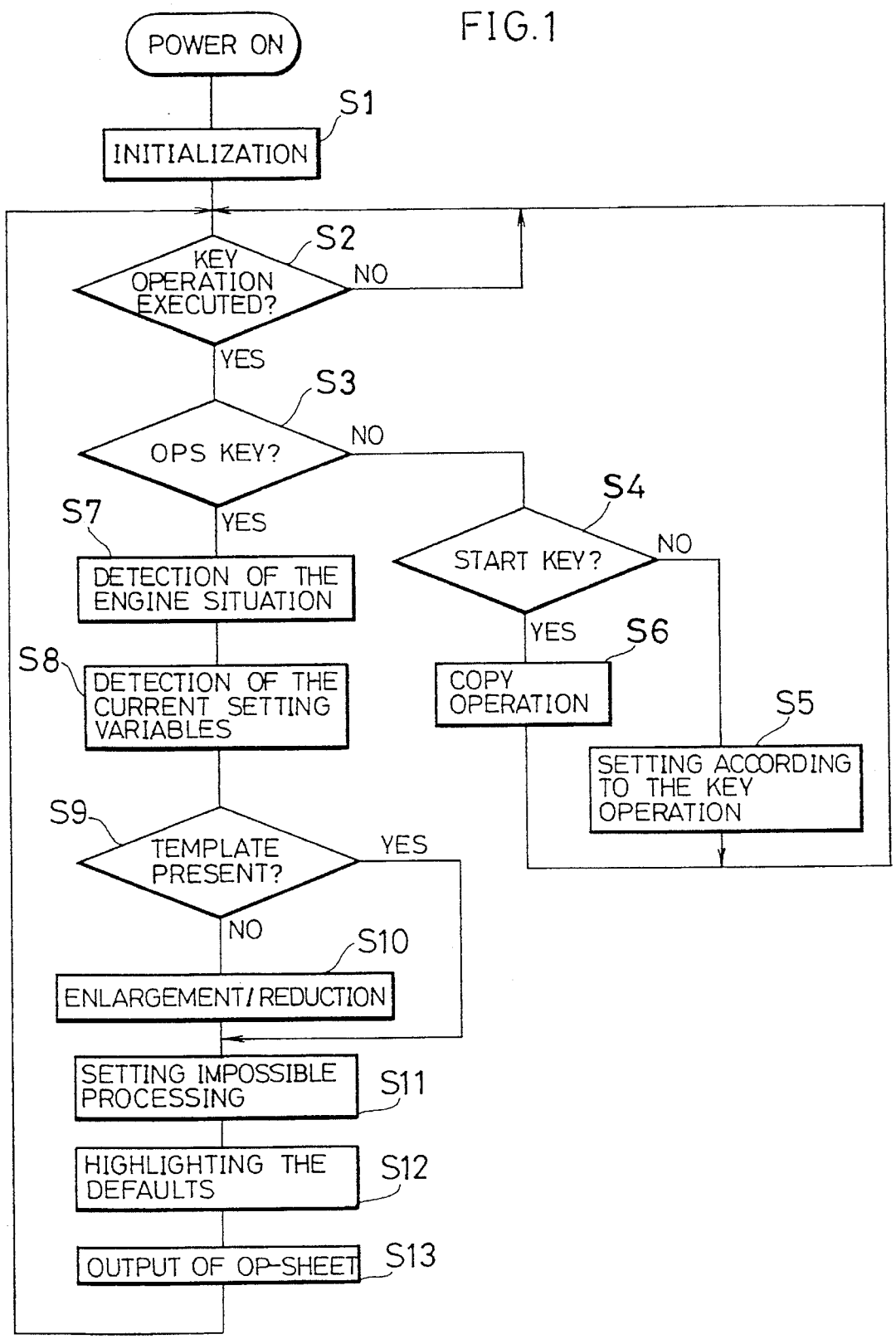

FIG. 2 (a)  EQUIVALENT MAGNIFICATION
 INDEPENDENT VARIABLE MAGNIFICATION FIG. 2 (b)  EQUIVALENT MAGNIFICATION
 INDEPENDENT VARIABLE MAGNIFICATION FIG. 2 (c)  *EQUIVALENT MAGNIFICATION*
 INDEPENDENT VARIABLE MAGNIFICATION FIG. 2 (d)  EQUIVALENT MAGNIFICATION
 INDEPENDENT VARIABLE MAGNIFICATION FIG. 2 (e)  EQUIVALENT MAGNIFICATION
 INDEPENDENT VARIABLE MAGNIFICATION FIG. 2 (f)  ✶ EQUIVALENT MAGNIFICATION
 INDEPENDENT VARIABLE MAGNIFICATION FIG. 2 (g)  EQUIVALENT MAGNIFICATION
 INDEPENDENT VARIABLE MAGNIFICATION FIG.3(a) PAPER SETTING ☐ AUTOMATIC PAPER SELECTION ☐ A4 ☐ A3 ☐ MANUAL PAPER FEED TRAY ☐ B5

FIG.3(b) PAPER SETTING ☐ AUTOMATIC PAPER SELECTION ☐ A4 ☐ A3 ☐ MANUAL PAPER FEED TRAY ☐ B5

FIG.3(c) PAPER SETTING ☐ AUTOMATIC PAPER SELECTION ☐ A3 ☐ MANUAL PAPER FEED TRAY ☐ B5

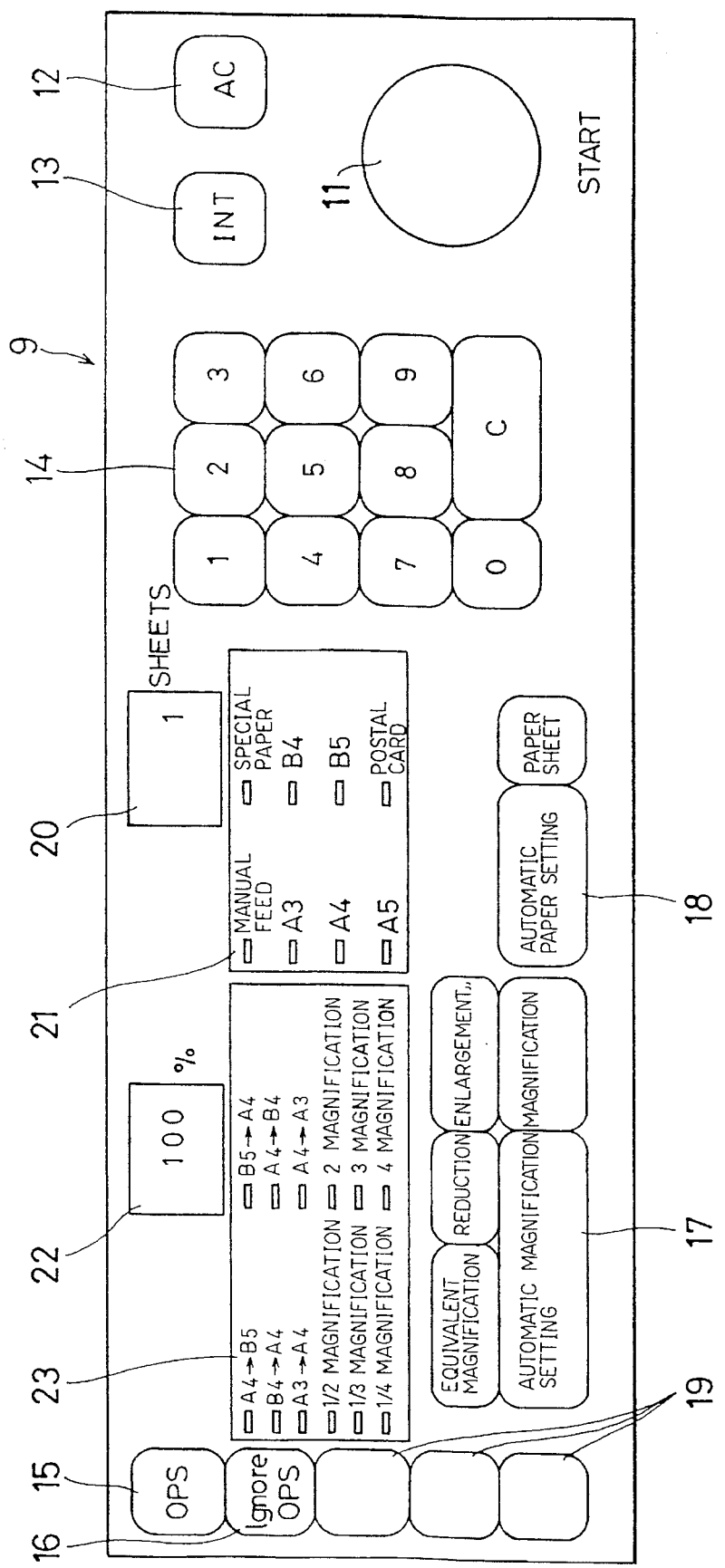

FIG. 9

OUTPUT OF VARIOUS SETTING
PAPER SHEETS
- ☐ OUTPUT OF FAX COVER SHEETS
- ☐ OUTPUT OF ADDRESS BOOK
- ☐ MASKING/CLIPPING
- ☐ OUTPUT OF FILING SHEET
- ☑ INDEX PRINT OUTPUT
- ☐ OUT OF KEYWORD SEARCH PAPER SHEET

COPY JOB SETTING
 NUMBER OF COPIES ☐☐☐ SETS

PAPER SETTING
- ☐ AUTOMATIC PAPER SELECTION
- ☑ MANUAL PAPER FEED TRAY
- ☐ A4  ☐ A3  ☐ B5

ENLARGEMENT/REDUCTION
- ☐ EQUIVALENT MAGNIFICATION
- ☐ AUTOMATIC VARIABLE MAGNIFICATION
- ☐ MANUAL VARIABLE MAGNIFICATION
- ☐ INDEPENDENT VARIABLE MAGNIFICATION   LENGTH ☐☐☐.☐ %   WIDTH ☐☐☐.☐ %
- ☐ PRESET VARIABLE MAGNIFICATION
  - ☐ 4TIMES  ☐ 3TIMES  ☐ 2TIMES  ☐ A4→A3  ☐ A4→B4  ☐ B5→A4
  - ☐ B5→B4  ☐ A5→B4  ☐ B4→A3
  - ☐ A4→B5  ☐ B4→A4  ☐ A3→A4
  - ☐ A3→B4  ☐ B5→A5  ☐ B4→B5  ☐ 1/2TIMES  ☐ 1/3TIMES  ☐ 1/4TIMES

DENSITY
- ☐ AUTOMATIC DENSITY SETTING
- ☐ MANUAL SETTING
  DARK ☐☐☐☐☐☐ LIGHT

☐ 2 in 1

EXTENSION
 Duplex
 - DOCUMENT → COPY
 - ☐ ONE SIDE → ONE SIDE
 - ☐ ONE SIDE → BOTH SIDES
 - ☐ BOTH SIDES → ONE SIDE
 - ☐ BOTH SIDES → BOTH SIDES Sorter
 - ☐ OFF
 - ☐ Sort
 - ☐ Group
 - ☐ Staple ON
 - ☐ 2in1 Book ON (Electric RDH)

SPECIAL SETTING
- ☐ IMAGE MODE  ☐ AUTOMATIC (MIX)  ☐ PHOTOGRAPH MODE  ☐ CHARACTER MODE
- ☐ BORDER ERASION  ☐ DOCUMENT BORDER ERASION  ☐ COPY BORDER ERASION  ☐ BOOK BORDER ERASION
- ☐ BINDING MARGIN  ☐ LEFT  ☐ RIGHT  ☐ TOP  ☐ BOOK
- ☐ PAGE NUMBER PRINTING
  POSITION ☐ BOTTOM CENTER  ☐ TOP RIGHT  ☐ BOOK BOTTOM CENTER  ☐ BOOK TOP RIGHT
- ☐ STAMP
  TYPE ☐ Confidencial  ☐ SHARP  ☐ SUPER CONFIDENCIAL
       ☐ A.S.A.P.
  POSITION ☐ ALL PAGES  ☐ ☐☐ PAGES ONLY
           ☐ BOTTOM CENTER  ☐ TOP  ☐ BOOK BOTTOM CENTER  ☐ BOOK TOP RIGHT

☐ NVRAM TO BE REWRITTEN

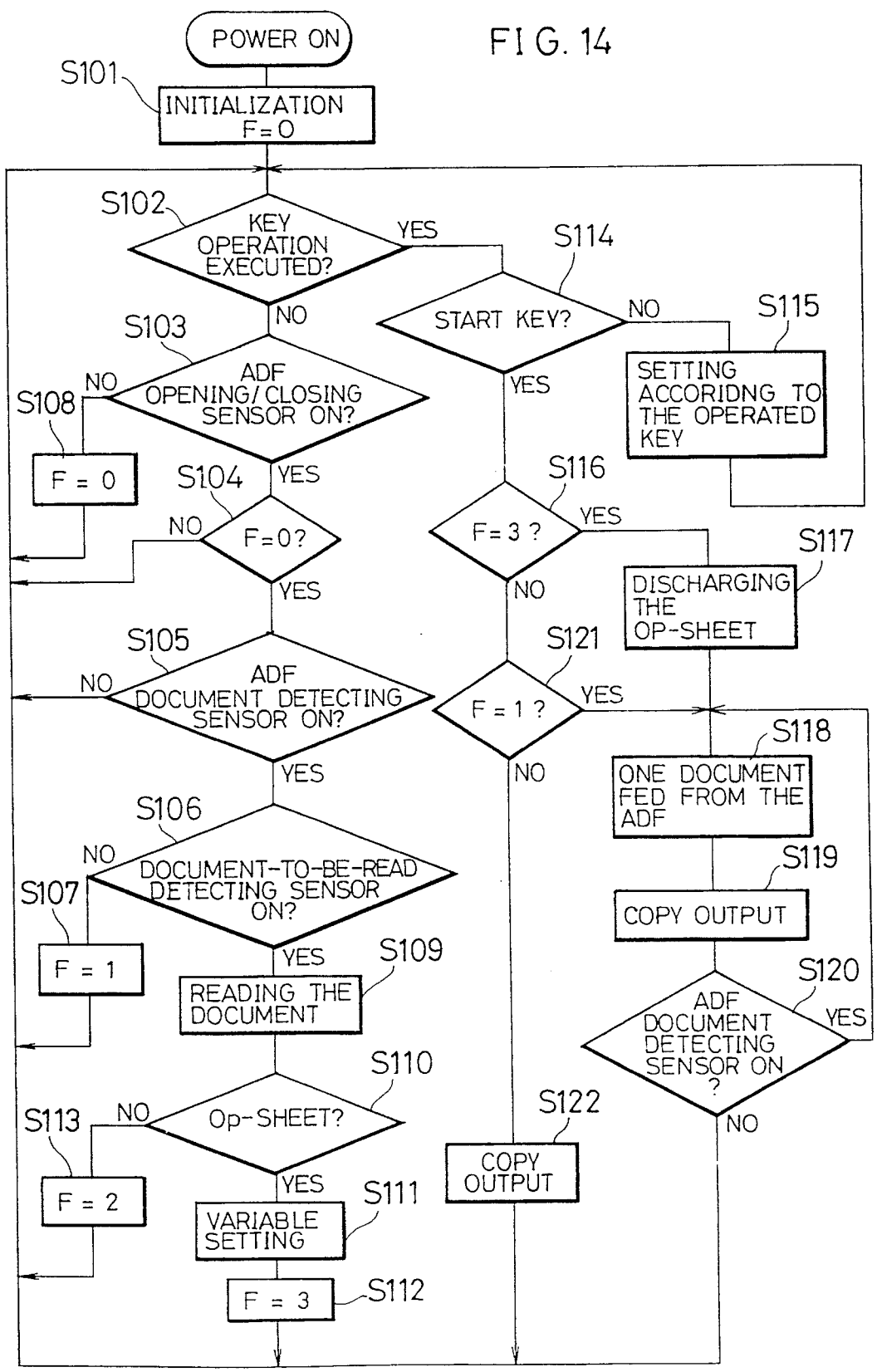

IMAGE FORMING APPARATUS CAPABLE OF SETTING AN OPERATIONAL MODE BY READING IMAGE OF A PREDETERMINED FORMAT

FIELD OF THE INVENTION

The present invention relates to an image forming apparatus such as a copying machine, a facsimile, a page printer, or an apparatus in which two or more of the machines above-mentioned are being combined, and more particularly relates to an image forming apparatus capable of setting an operational mode by reading the image of a predetermined format set forth on a paper sheet.

BACKGROUND OF THE INVENTION

In a conventional copying machine, the operational mode is determined by the operator who successively sets, on the operation panel, setting items such as a paper size, the rate of enlargement/reduction and the like. Thereafter, the start key is pressed to make a copying operation in the operational mode thus set.

On the other hand, Japanese Patent Laid-Open Publication 5-112064 for example discloses a printer apparatus arranged such that an operation setting paper sheet in the form of a mark sheet is read by a scanner to analyze the contents thereof, that there is recognized, as the paper size for example, the selection item of A4, B4, B5 or the like on which a mark has been put, and that the operational mode is automatically set to the marked item.

In a copying machine set forth in Japanese Patent Laid-Open Publication 5-63868, there is used, as the operation setting paper sheet, a sheet having a predetermined bar code put thereon at each corner thereof, and this operation setting paper sheet is placed on an automatic document feed device together with a sheaf of documents, such that the operation setting paper sheet is fed first to a document platen to automatically set the operational mode, likewise in the printer apparatus above-mentioned. Thereafter, an operation of copying a document subsequently fed to the document platen, is executed in the operational mode thus set. This saves the labor of setting various items on the operation panel.

However, when the copying operation is repeated using such an operation setting paper sheet, an erroneous operation readily takes place due to a reading error. More specifically, since the operation setting paper sheet is required for each copying operation, an operation setting paper sheet to be actually used for each operation is copied each time from the original operation setting paper sheet. Such a respective copying operation causes the quality of the image of a predetermined format on the operation setting paper sheet to be lowered or the image of the predetermined format to be positionally shifted. As a result, the problem is presented in that the image may not be read, or the read image is erroneously analyzed, resulting in an erroneous operation.

On the other hand, the following problems are encountered when such a method of setting the operational mode by marks put on an operation setting paper sheet as above-mentioned, is applied, as it is, to apparatus such as a digital copying machine or the like having a variety of functions for each of which a large number of items are to be set. The operation of putting a mark to each of all setting items rather lowers the working efficiency and maneuverability. If there is an omission of entry, the copying operation is executed in an operational mode which has not been expected by the operator. As a result, an erroneous operation readily takes place.

It may be proposed that provision is made such that, for example, a default data set at delivery from the factory, is automatically set for the setting item for which no mark has been put on any of the selection items thereof. However, since the operator does not always recognize what is set by a default data, such a proposal cannot sufficiently solve the problem that a copying operation is executed in an operational mode which has not been expected by the operator.

SUMMARY OF THE INVENTION

It is an object of the present invention to provide an image forming apparatus capable of not only reducing the occurrence of an erroneous operation when setting an operational mode with the use of an operation setting paper sheet, but also improving the working efficiency and maneuverability.

To achieve the object above-mentioned, an image forming apparatus of the present invention is characterized by including:

reading means for reading an image of a document placed on a document platen;

image forming means for forming an image based on the image of the document read by the reading means, the image thus formed being supplied as printed;

image memory means for storing an operation setting image;

operational mode setting means arranged such that when an operation setting paper sheet having an operation setting image printed thereon is placed on the document platen, an operational mode for the image forming means is set according to selection items to which selection marks have been put in the operation setting image read by the reading means from the operation setting paper sheet; and operation setting paper output control means for controlling the image forming means so as to supply the operation setting image read from the image memory means as printed upon receiving an instruction from an operation panel, the operation setting paper output control means including highlighting processing control means for preparing an operation setting image to be outputted by executing a high-light drawing processing on a specific selection item in the operation setting image read from the image memory means so as to distinguish the specific selection item from other selection items.

The image forming apparatus above-mentioned is arranged such that an operation setting image is stored in the image memory means, and that an operation setting paper sheet is printed and supplied based on this operation setting image. It is therefore possible to suitably provide, as the original free from a reduction in image quality and positional shift, an operation setting paper sheet having an image quality which is identical with that provided by this image forming apparatus itself and with which the data can securely be read by this image forming apparatus. This not only reduces the occurrence of reading errors, but also prevents erroneous operations more securely as compared with the conventional operation setting paper sheet used as repeatedly copied.

Further, in the operation setting image stored in the image memory means, an operation setting image to be outputted is prepared, wherein a high-light drawing processing is applied to a specific selection item. This arrangement enables the operation setting paper sheet outputted with the image printed thereon to be used also as informing means for informing the internal information of the image forming apparatus to the user.

For example, in an image forming apparatus arranged such that a default value at delivery from the factory is set to a setting item to which no selection mark has been put, the operation setting paper sheet is supplied with the high-light drawing processing executed on the selection item corresponding to the default value. This enables the operator to make sure at glance what is to be set when the operator makes no setting. This not only prevents an erroneous operation, but also saves the trouble of mark entry.

In the image forming apparatus above-mentioned, the operation setting paper output control means preferably has mismatch processing means arranged such that, when mismatched items preventing an operational mode from being set, are discovered in the selection marks in the operation setting image read by the reading means, the highlighting processing control means is controlled such that the high-light drawing processing is executed on the selection items including the mismatched items.

According to the arrangement above-mentioned, the following processing is executed if there is an entry error in the settings on the operation setting paper sheet by the operator. In the setting item of paper size for example, if there is such an entry error that marks have been put on two selection items which respectively represent two different paper sizes, there is printed and supplied an operation setting paper sheet in which the high-light drawing processing has been executed on the setting item in which the entry error has been made. This informs the operator of the setting item where an error was made. Accordingly, the operator can immediately correct the error with no necessity for checking the items for erroneous setting. This not only reduces the occurrence of errors in setting with the use of an operation setting paper sheet, but also improves the maneuverability and working efficiency.

These and other objects, features and advantages of the present invention will be more fully apparent from the following detailed description set forth below when taken in conjunction with the accompanying drawings.

BRIEF DESCRIPTION OF THE DRAWINGS

FIG. 1 is a flow chart illustrating the entire control procedure of an image forming apparatus in accordance with a first embodiment of the present invention;

FIG. 2 (a) is an enlarged view illustrating a selection item to which there has been executed a high-light drawing processing in a bold style on the operation setting paper sheet printed out by the image forming apparatus in FIG. 1;

FIG. 2 (b) is an enlarged view illustrating a selection item to which there has been executed a high-light drawing processing using an underline on the operation setting paper sheet printed out by the image forming apparatus in FIG. 1;

FIG. 2 (c) is an enlarged view illustrating a selection item to which there has been executed a high-light drawing processing in an italic style on the operation setting paper sheet printed out by the image forming apparatus in FIG. 1;

FIG. 2 (d) is an enlarged view illustrating a selection item to which there has been executed a high-light drawing processing using a net background on the operation setting paper sheet printed out by the image forming apparatus in FIG. 1;

FIG. 2 (e) is an enlarged view illustrating a selection item to which there has been executed a high-light drawing processing with the use of a different character form on the operation setting paper sheet printed out by the image forming apparatus in FIG. 1;

FIG. 2 (f) is an enlarged view illustrating a selection item to which there has been executed a high-light drawing processing with the addition of a special character on the operation setting paper sheet printed out by the image forming apparatus in FIG. 1;

FIG. 2 (g) is an enlarged view illustrating a selection item to which there has been executed a high-light drawing processing by coloring a check area on the operation setting paper sheet printed out by the image forming apparatus in FIG. 1;

FIG. 3 (a) is an enlarged view of the selection items of a setting item of "Paper Setting" on the operation setting paper sheet printed out by the image forming apparatus in FIG. 1;

FIG. 3 (b) is an enlarged view of the setting item "Paper Setting" in which an unavailable selection item out of the selection items in FIG. 3 (a), is distinguished in color from other items;

FIG. 3 (c) is an enlarged view of the setting item "Paper Setting" in which an unavailable selection item out of the selection items in FIG. 3 (a), is shown as a blank;

FIG. 6 (b) is a flow chart of the detailed control procedure of a mismatch processing in the variable setting processing in FIG. 6 (a);

FIG. 6 (c) is a flow chart of the detailed control procedure of a mark portion setting processing in the variable setting processing in FIG. 6 (a);

FIG. 7 (b) is a perspective view of the appearance of the image forming apparatus with the automatic document feed device at the top opened;

FIG. 8 is a front view of the operation panel of the image forming apparatus in FIG. 1;

FIG. 9 is a view illustrating a printing example of the operation setting paper sheet used in the image forming apparatus in FIG. 1;

FIG. 14 is a flow chart of the general control procedure of an image forming apparatus according to a fourth embodiment of the present invention.

DESCRIPTION OF THE EMBODIMENTS

[FIRST EMBODIMENT]

The following description will discuss a first embodiment of the present invention with reference to FIG. 1 to FIG. 11.

Figure 7A:
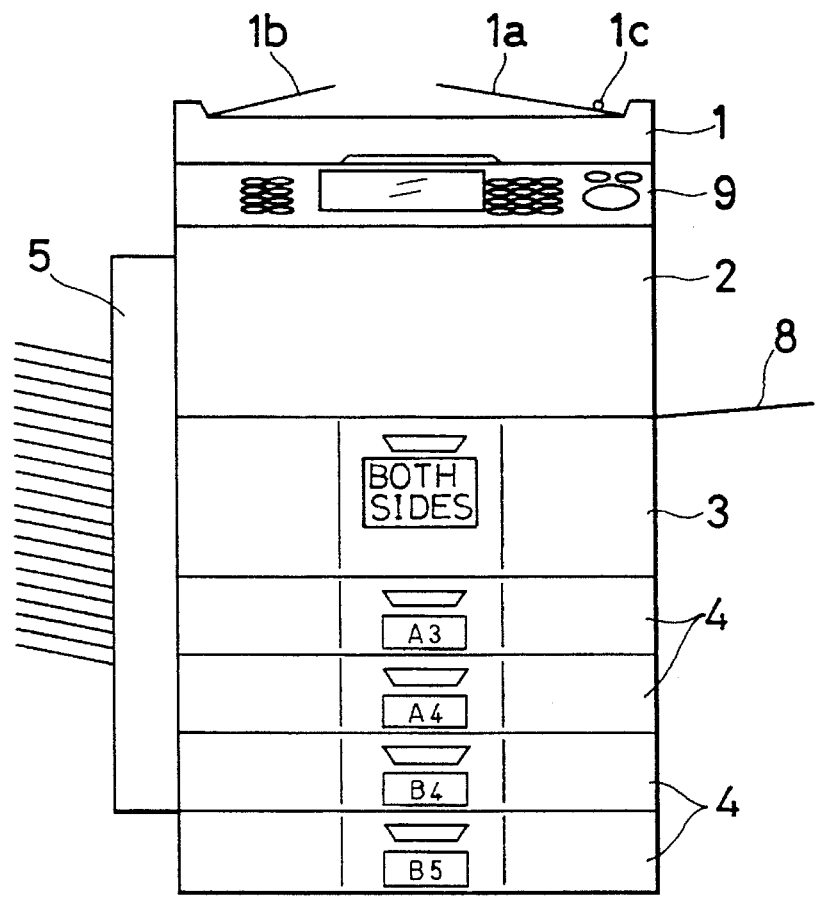
FIG. 7 (a) is a front view of the appearance of the image forming apparatus in FIG. 1.
Figure 7B:
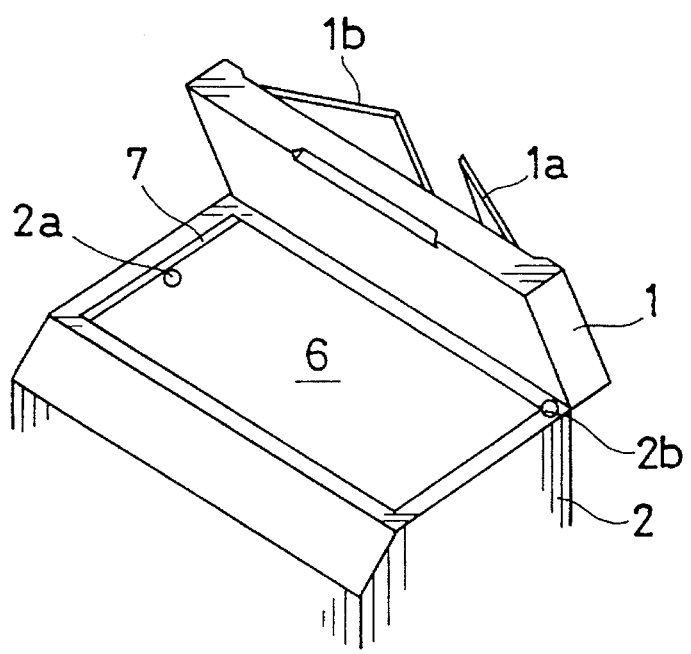

As shown in FIG. 7 (a), a digital copying machine serving as an image forming apparatus according to the first embodiment of the present invention, comprises an automatic document feed device (hereinafter referred to as ADF) 1, an image forming unit (image forming means) 2, a both-side unit 3, and a plurality of paper feed units 4, these device and units being successively disposed in this order from above. A paper discharge unit 5 is disposed at the left lateral side of the digital copying machine.

As shown in FIG. 7 (b), the ADF 1 is openably attached to the image forming unit 2 at the top thereof. The image forming unit 2 is provided on the top thereof with a document platen 6 made of a transparent glass plate. Disposed under the document platen 6 is a document reading unit (hereinafter referred to as scanner) 7 serving as reading means comprising a linear image sensor. This scanner 7 is arranged to scan a document (not shown) placed on the document platen 6, thereby to read the image information drawn on the document.

The image forming unit 2 has a document-to-be-read detecting sensor 2a for detecting the presence or absence of a document on the document platen 6, and an ADF opening/closing sensor 2b for detecting whether the ADF 1 is opened or closed. The document-to-be-read detecting sensor 2a is disposed in the vicinity of the scanner 7, while the ADF opening/closing sensor 2b is disposed at a corner of the top of the image forming unit 2.

As shown in FIG. 7 (a), the ADF 1 is provided on the top thereof with a document feed tray 1a and a document discharge tray 1b. The document feed tray 1a is mounted to an ADF document detecting sensor 1c for detecting the presence or absence of a document on the document feed tray 1a. The ADF document detecting sensor 1c is arranged to supply a signal which is turned on when a document is placed on the document feed tray 1a, and off when no document is placed thereon.

When both the ADF opening/closing sensor 2b and the ADF document detecting sensor 1c are turned on, i.e., the ADF 1 is closed and a plurality of documents are placed on the document feed tray 1a, and when the operational mode is set to the copying mode, the lowermost document is fed from the document feed tray 1a to the underside of the ADF 1 or the top of the document platen 6. After the document is once stopped on the document platen 6 such that the image thereon is scanned and read by the scanner 7, the document is sent from the document platen 6 to the document discharge tray 1b. Such operations are repeated until the documents on the document feed tray 1a runs out, i.e., until the signal detected by the ADF document detecting sensor 1c is turned off. The ADF 1 may optionally be provided with a document obverse/reverse inverting function.

The image forming unit 2 incorporates a photoreceptor drum (not shown), a developing device (not shown), a fixing device (not shown) and the like, and is arranged such that, based on the image information read by the scanner 7 and previously stored image information or the like to be discussed later, an image is formed on a paper sheet fed from any of the paper feed units 4, and that the paper sheet is then sent to the paper discharge unit 5.

The both-side unit 3 has a function for inverting, in the both-side copying mode, a paper sheet having one side on which an image has been formed by the image forming unit 2. By feeding the paper sheet inverted by the both-side unit 3 again to the image forming unit 2, the paper sheet can be copied on both sides thereof.

The paper feed units 4 have cassettes which respectively house paper sheets respectively having different sizes such as A3, A4, B4, B5 and the like. In the copying mode, paper sheets are fed, one by one, to the image forming unit 2 from the paper feed unit 4 housing paper sheets having a selected size.

A manual paper feed tray 8 is disposed on the image forming unit 2 at the lateral side thereof opposite to the lateral side where the paper discharge unit 5 is disposed. This is a part where a paper sheet can be fed, in addition to the paper feed units 4. The both-side unit 3 and the paper feed units 4 may optionally be provided. The paper discharge unit 5 may optionally be arranged such that it has a sort function, a group function, a staple function as a job completion processing, or the like.

In the following description, there are called, a print engine, the members which are actually operated, in the operational mode of forming an image on a paper sheet which is then supplied, along the paper delivery passage from the paper feed units 4 to the paper discharge unit 5 through the image forming unit 2 and the both-side unit 3.

As shown in FIG. 7 (b), the image forming unit 2 is inclined at the top front side thereof where there is disposed an operation panel 9 for setting the operational mode and displaying the situations in the digital copying machine. As shown in FIG. 8, the operation panel 9 has, as operational mode setting keys, a start key 11, an all clear (AC) key 12, an interrupt (INT) key 13, ten keys 14 for entering numerical values, an operation setting sheet (OPS) output key 15, an operation setting sheet ignore (Ignore OPS) key 16, magnification setting keys 17, paper setting keys 18 and special setting keys 19.

The start key 11 is a key for starting a copying operation to be discussed later. The all clear key 12 is a key for cancelling all the settings including the settings made on the operation panel 9 and the settings made by an operation setting paper sheet to be discussed later. When this key 12 is pressed, the already set values are cancelled and newly set to the default values at the delivery from the factory, or the default values at the entry of the power source. The interrupt key 13 is a key for interrupting the copying job which is currently being executed, such that an interrupt copying operation can be executed with the operational settings changed.

The ten keys 14 are keys for entering numerical values to be used for entering the number of copies or the like. The operation setting sheet output key 15 is a key for supplying an image serving as an operation setting paper sheet to be discussed later, this image being formed on a paper sheet. The operation setting sheet ignore key 16 is a key for not regarding an operation setting paper sheet placed on the document platen 6 as the operation setting paper sheet, but for handling it as a normal document.

The magnification setting keys 17 comprise a plurality of keys for respectively setting the rates of enlargement/reduction for automatic magnification setting, selection of preset magnification setting, manual magnification setting and the like. The paper setting keys 18 comprise an automatic paper setting key and a manual paper setting key. The special setting keys 19 are disposed for operating a sort function, a group function, a staple function and the like of the paper discharge unit 5.

Further, the operation panel 9 has, as a display part, a number-of-copies display 20, a paper size display 21, an enlargement/reduction rate display 22 and a preset enlargement/reduction rate display 23. Displayed on the number-of-copies display 20 is the number of copies set by the ten keys 14 or the like. A copying operation is to be repeated, for one document, at times corresponding to the number displayed on the number-of-copies display 20. The paper size display 21 is to display the copy paper size. The enlargement/reduction rate display 22 is to display the set rate of enlargement/reduction in terms of a numerical value. The preset enlargement/reduction rate display 23 is to display a standard rate of enlargement/reduction with its pilot lamp coming on when this standard rate of enlargement/reduction is set for a copying operation in which, for example, a A4-size document is to be copied on a B5-size paper sheet.

On the other hand, the digital copying machine of the first embodiment is arranged such that, when an image according to a predetermined format is drawn in the image of a document placed on the document platen 6, this document is recognized as the operation setting paper sheet, that the image information set forth therein is analyzed to extract the mode setting information, and that the operational mode is automatically set based on the mode setting information. The following description will discuss an example of such an operation setting paper sheet with reference to FIG. 9.

Such an operation setting paper sheet (hereinafter referred to as Op-sheet) 24 has identification marks 25 at total eight positions, i.e., the upper right, upper left, lower right, lower left on the obverse and reverse sides of the sheet such that the mode setting information can readily be detected whenever the sheet is fed in any of the directions. These identification marks 25 include not only an ID representing that the sheet is the Op-sheet 24, but also signs representing the obverse side, the reverse side and the positions (upper right, upper left and the like).

The Op-sheet 24 has zones for the setting items corresponding to the operation keys on the operation panel 9, e.g., (i) numeral entry portions 26 such as the number of copies, (ii) selection items 27 such as automatic paper selection, manual paper feed tray, paper size (A4, A3, B5) and the like for the setting item of paper setting, and (iii) check areas 28 in the form of in front of the selection items 27. When a selection mark in the form of V or the like is put on any of the check areas 28, there can be read which selection item has been selected.

The Op-sheet 24 is provided at the lowermost position thereof with a rewrite selection portion 29 for selecting whether or not an NVRAM 35 to be discussed later is to be rewritten. When a check mark is entered here, the contents stored in the NVRAM 35 are to be rewritten, but the detail will be discussed later.

Figure 10:
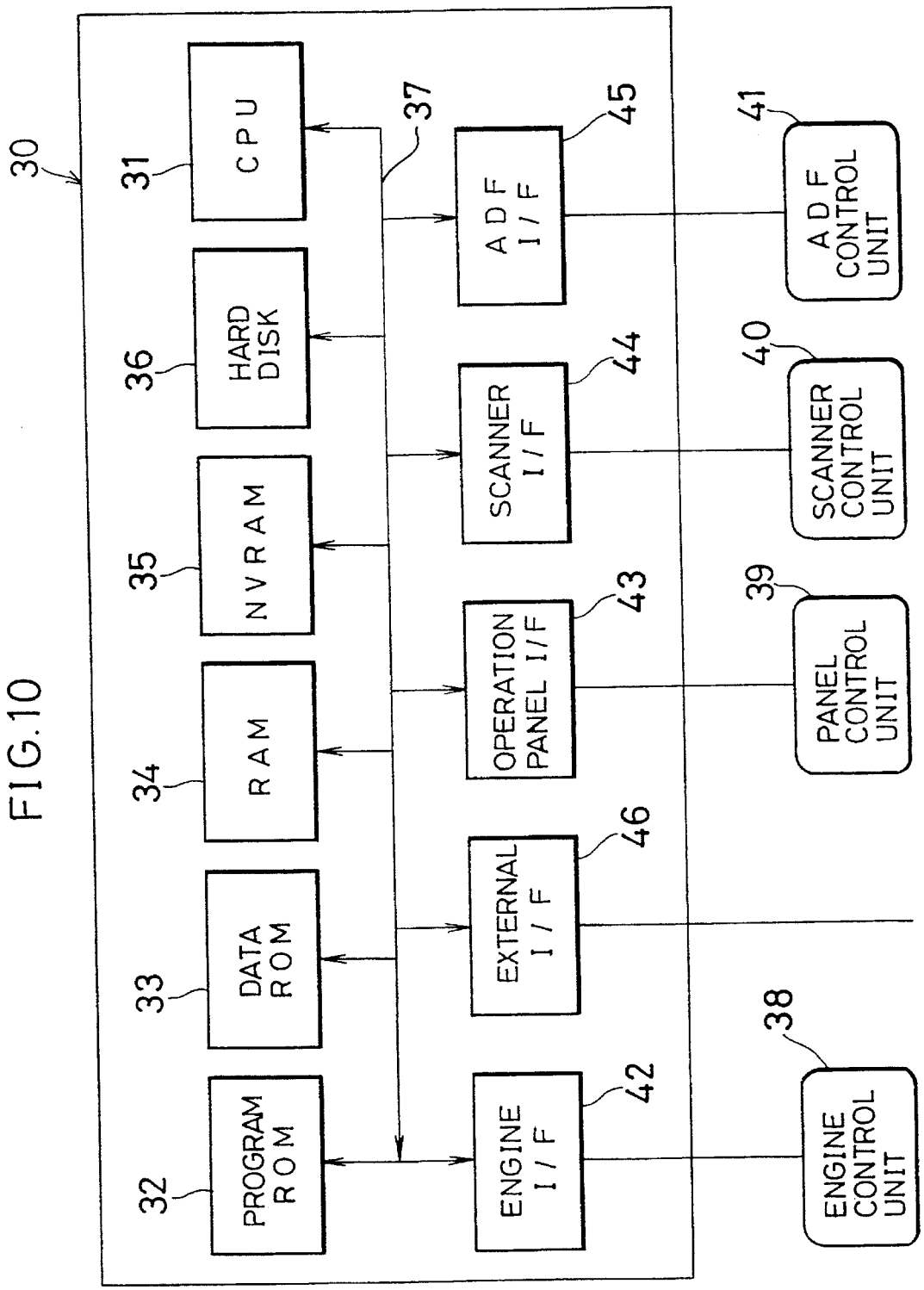
FIG. 10 is a block diagram of the arrangement of a control device of the image forming apparatus in FIG. 1.

With reference to FIG. 10, the following description will discuss the arrangement of a control device for controlling the digital copying machine in its entirety.

The control device has a control system 30 serving as the core of control. The control system 30 has a central operation processing unit (hereinafter referred to as CPU) 31 having composite functions of operational mode setting means, operation setting paper sheet output control means, highlighting processing control means and mismatch processing means. A program ROM 32, a data ROM (image memory means) 33, a RAM 34, non-volatile memory means (hereinafter referred to as NVRAM) 35 and a hard disk 36 are connected to the CPU 31 through data buses 37.

A program for controlling the digital copying machine is stored in the program ROM 32. Stored in the data ROM 33 are data such as format data (hereinafter referred to as template) which serve as an operation setting image drawn on the Op-sheet 24. Stored in the RAM 34 are the image data read by the scanner 7 and the variables set by the Op-sheet 24, etc. The variables set by the operation panel 9 and the like are stored in the NVRAM 35 arranged to hold the stored data even though the power is turned off. The read image data and the like are stored in the hard disk 36 and held even though the power is turned off.

Connected to the data buses 37 are an engine control unit 38 for controlling the print engine, a panel control unit 39 disposed on the operation panel 9, a scanner control unit 40 for controlling the scanner 7, and an ADF control unit 41 for controlling the ADF 1. These control units 38, 39, 40, 41 are connected through an engine interface (hereinafter "interface" will briefly be referred to as I/F) 42, an operation panel I/F 43, a scanner I/F 44 and an ADF I/F 45, respectively.

The print engine is to be controlled while transmitting necessary data between the CPU 31 and the engine control unit 38. When a key on the operation panel 9 is operated or a variable set by the Op-sheet 24 is changed, data are transmitted between the CPU 31 and the panel control unit 39. The panel control unit 39 is arranged to control the operation panel 9 such that the operated key is analyzed to form and send, to the CPU 31, a setting information command according to the operated key, and that the display contents at the displays on the operation panel 9 are changed according to the key operation or the setting data sent from the CPU 31.

Through the scanner I/F 44, the scanner 7 is controlled by the CPU 31 and the image data read by the scanner 7 is transmitted to the RAM 34. Further, an instruction signal for starting the operation of the ADF 1, a signal detected by the ADF document detecting sensor 1c or the like, is communicated between the CPU 31 and the ADF control unit 41 through the ADF I/F 45.

The control system 30 further comprises (i) an external I/F 46 for making a communication with an external device and (ii) a FAX modem I/F (not shown). Through this FAX modem I/F, the FAX modem is controlled by the CPU 31, image data are transmitted from the digital copying machine through a public circuit, and image data are received from the outside.

The following description will discuss the arrangement of the main portions, in the control device above-mentioned, for controlling the operations mainly in the copying operation mode.

Figure 11:
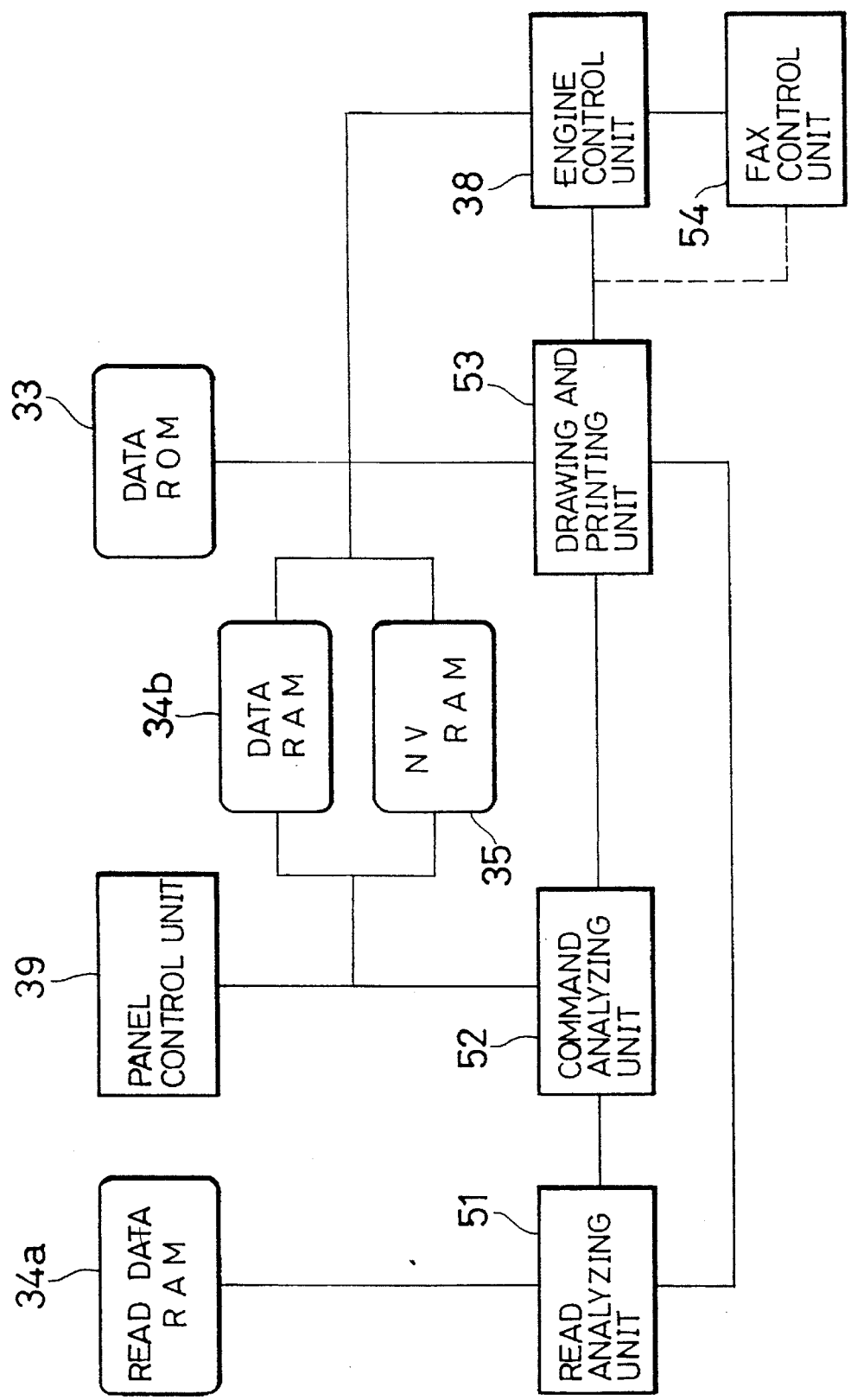
FIG. 11 is a block diagram of the arrangement of the main portions relating to a copying operation in the image forming apparatus in FIG. 1.

The CPU 31 is operated according to a control program stored in the program ROM 32. As shown in FIG. 11, the CPU 31 is arranged to achieve the functions of a read analyzing unit 51, a command analyzing unit 52 and a drawing and printing unit 53. The RAM 34 is divided into a read data RAM 34a for storing the image data read by the scanner 7, and a data RAM 34b for storing the variables and the like set by the Op-sheet 24.

The read analyzing unit 51 is arranged to analyze the image data in the read data RAM 34a for judging whether or not the image data are the data read from the Op-sheet 24. When the image data are the data read from the Op-sheet 24, the read analyzing unit 51 analyzes the setting information in the read data for supplying a command corresponding to the setting information to the command analyzing unit 52. When the image data are not the data read from the Op-sheet 24, the read analyzing unit 51 supplies the image data, as image information, to the drawing and printing unit 53.

The command analyzing unit 52 is arranged to analyze a command entered from the read analyzing unit 51 in the manner above-mentioned and a setting information command entered from the panel control unit 39 such that, based on the analysis result, a control instruction required for a copying operation at that time is generated and that the control instruction thus generated is supplied to the drawing and printing unit 53 or the engine control unit 38.

The drawing and printing unit 53 is arranged such that, based on the image information entered from the read analyzing unit 51, the data from the data ROM 33, the setting information from the command analyzing unit 52 and the like, there is formed an image to be actually printed out on a paper sheet, and that the image thus formed is supplied to the engine control unit 38. The template of the Op-sheet 24 or other instruction sheet, the control data (default values and the like) and the font are stored in the data ROM 33. In the mode in which the image data are transmitted through a public circuit, the image formed by the drawing and printing unit 53 is supplied to a fax control unit 54 connected to the FAX modem I/F.

The engine control unit 38 is arranged to receive image data from the drawing and printing unit 53 and to operate the print engine such that the image data are printed out on a paper sheet based on the control instruction from the command analyzing unit 52 and the setting mode stored in the data RAM 34b at that time. Setting variables required for actually executing a copying operation, are stored in the data RAM 34b. The data RAM 34b has a shunting zone such that, when the interrupt key 13 is operated to move the sequence to an interrupt copying operation and the copying operation under way immediately before the interrupt key 13 is pressed, is being executed based on the setting contents set by the Op-sheet 24, the setting contents are temporarily shunted into the shunting zone until the interrupt copying operation is finished.

The contents set by the operation panel 9 are stored in the NVRAM 35. In an interrupt copying operation, the contents stored in the NVRAM 35 are read out, and a copying operation based on the contents thus read is started when the start key 11 is operated.

The following description will discuss a specific control procedure to be conducted by the CPU 31 in the digital copying machine.

As shown in FIG. 1, when the power is turned on, the memories such as the read data RAM 34a and the like are cleared and the setting variables in the data RAM 34b are initialized and set (S1). At this time, the setting contents stored in the NVRAM 35 are written in the data RAM 34b. Further, "0" is initially set in an Op-sheet ignore flag Figno (not shown) and an interrupt flag Fint (not shown). The sequence is to wait for a key operation on the operation panel 9 (S2). When a key operation is executed, it is successively judged whether the operated key is the OPS key 15 or the start key 11 at S3 and S4.

When the operated key is other key than the OPS key 15 and the start key 11, the sequence proceeds from S4 to S5 where the setting variables are changed according to the operated key, and the sequence is returned to S2. When the operated key is the Ignore OPS key 16, the OP-sheet ignore flag Figno is rewritten by "1". When the operated key is the start key 11, the sequence proceeds from S4 to S6 where a copying operation is executed, and the sequence is returned to S2. Control for such a copying operation will be discussed in detail later. When the interrupt key 13 is pressed during the copying operation, the interrupt flag Fint is rewritten by "1".

When it is Judged at S3 that the operated key is the OPS key 15, there will be executed an Op-sheet printing processing from S7 to S13. At S7, there are detected the situations of optional functions provided in the print engine and the situations of available paper sizes and the like. The optional functions include the document inverting function in the ADF 1, the both-side copying function in the both-side unit 3, the sort or staple functions in the paper discharge unit 5 and the like.

Then, there are detected, from the operation panel 9, the current setting situations of a variety of setting variables (S8). At this time, the setting values as to the number of copies and the paper size are recognized as the number of Op-sheets 24 to be printed out and the paper size in which the Op-sheets 24 are to be printed out.

Then, the Op-sheet 24 is subjected to a drawing processing. First, it is judged at S9 whether or not the template of the Op-sheet 24 is stored in the data ROM 33 in a size corresponding to the desired paper size detected at S8. When the size is different, the template is enlarged/reduced according to the desired paper size (S10). Based on the situations of the print engine detected at S7, there is executed a setting impossible processing, to be discussed later, on each of the setting items which cannot be used (S11). Based on the setting situations of the operational mode detected at S8, there is executed a high-light drawing processing, to be discussed later, on each of selection items 27 corresponding to the setting situations above-mentioned. There is thus formed the final output image, i.e., an operation setting image to be supplied (S12), which is then supplied to the engine control unit 38. Accordingly, paper sheets printed out in the format shown in FIG. 9 are supplied in the desired paper size and in the desired number (S13). When such an output of the Op-sheet 24 is completed, the sequence is returned to S2.

Examples of the high-light drawing processing are shown in FIG. 2 (a) to FIG. 2 (g), each of which shows, as an example, a setting item of "Enlargement/Reduction" in the Op-sheet 24 in FIG. 8, and each of which shows an example where a selection item of "Equivalent Magnification" is highlighted. More specifically, the characters "Equivalent Magnification" are printed out more thickly than other selection items such as "Independent variable Magnification" as shown in FIG. 2 (a). Other examples of the high-light drawing processing include: an underline processing as shown in FIG. 2 (b); an italic font processing as shown in FIG. 2 (c); a character decoration such as a mesh processing or the like as shown in FIG. 2 (d); a processing of changing the character form from the Gothic type to the Roman type as shown in FIG. 2 (e); a processing of adding a special character such as "*" or the like as shown in FIG. 2 (f); and a processing of coloring a check area 28 as shown in FIG. 2 (g).

With the use of the Op-sheet 24 supplied after subjected to a processing as above-mentioned, the operational mode may be set. In such a case, when no selection mark has been put, by the operator, on the check area 28 for any selection item 27 of the setting item "Enlargement/Reduction" for example, the operational mode is set to the selection item for which a high-light drawing has been made, i.e., "Equivalent Magnification" in the example above-mentioned. Accordingly, the operator is not required to put a mark, on the supplied Op-sheet 24, for the selection item which is not required to be changed. This facilitates the operation. Further, based on the supplied Op-sheet 24, the operator can readily recognize in which of the section items, any item has not been selected. This prevents an erroneous setting operation.

In the foregoing description, a high-light drawing processing is executed on a selection item based on the setting contents of the operation panel 9 detected immediately before the Op-sheet 24 is printed out. However, a high-light drawing processing may be executed based on the default values set at the delivery from the factory or the power-on default values to be initially set when the power is turned on.

Each of FIG. 3 (b) and FIG. 3 (c) shows an example of the setting impossible processing at S8. For example, it is now supposed that there are provided, as selection items, Automatic Paper Selection, Manual Paper Feed Tray, A4, A3 and B5 for a setting item of "Paper Setting" on the Op-sheet 24, as shown in FIG. 3 (a). When it is detected based on the detection result of the print engine situation that paper in the A4 paper feed unit 4 has run out, the selection item A4 is printed in grey as shown in FIG. 3 (b) or as a blank as shown in FIG. 3 (c). This enables the operator to recognize at a glance what cannot be set. This prevents an erroneous operation.

The following description will discuss the control procedure of the copying operation executed at S6 in FIG. 1.

Figure 4:
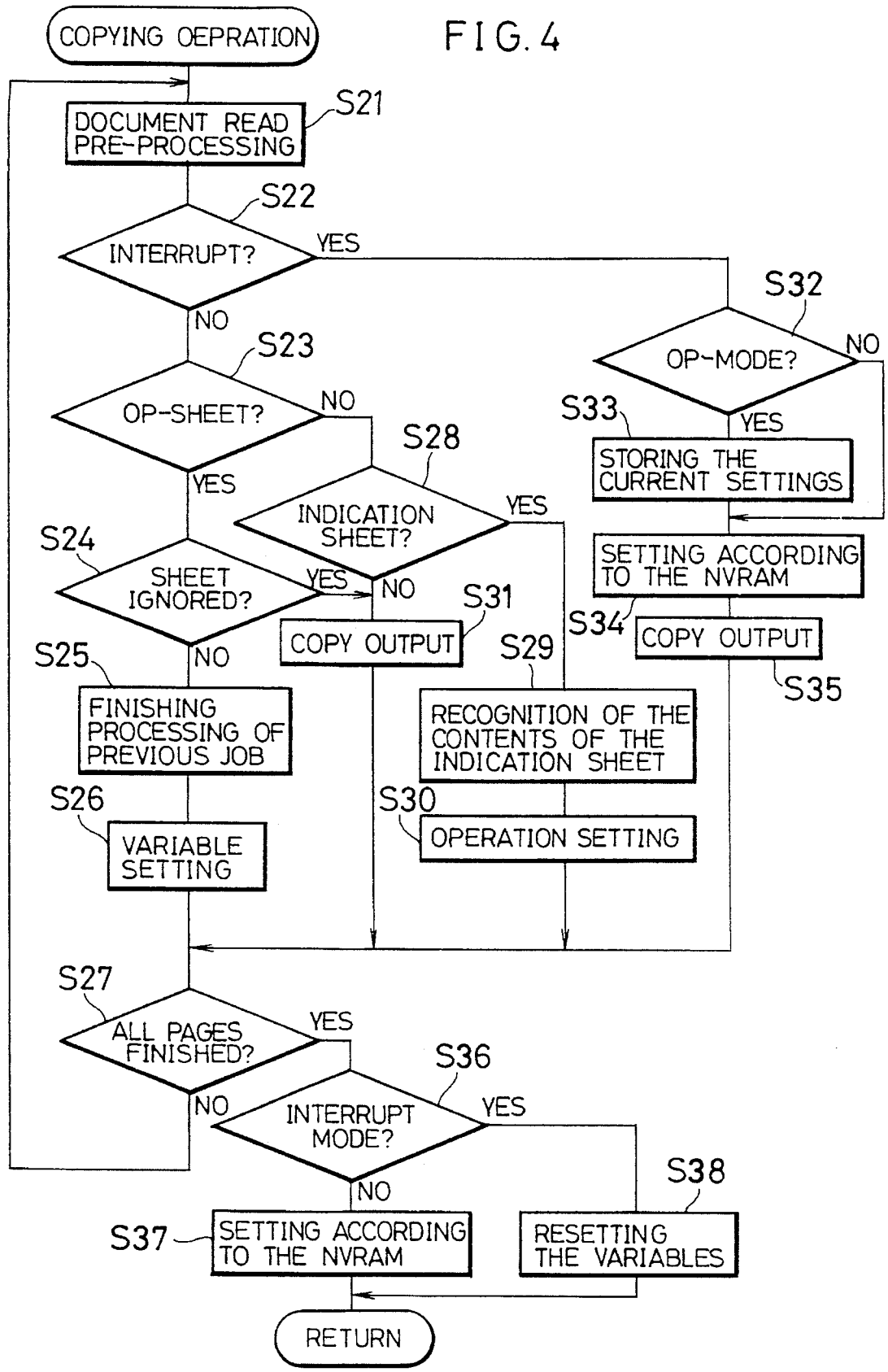
FIG. 4 is a flow chart of the control procedure of a copying operation to be executed by the image forming apparatus.
Figure 5:
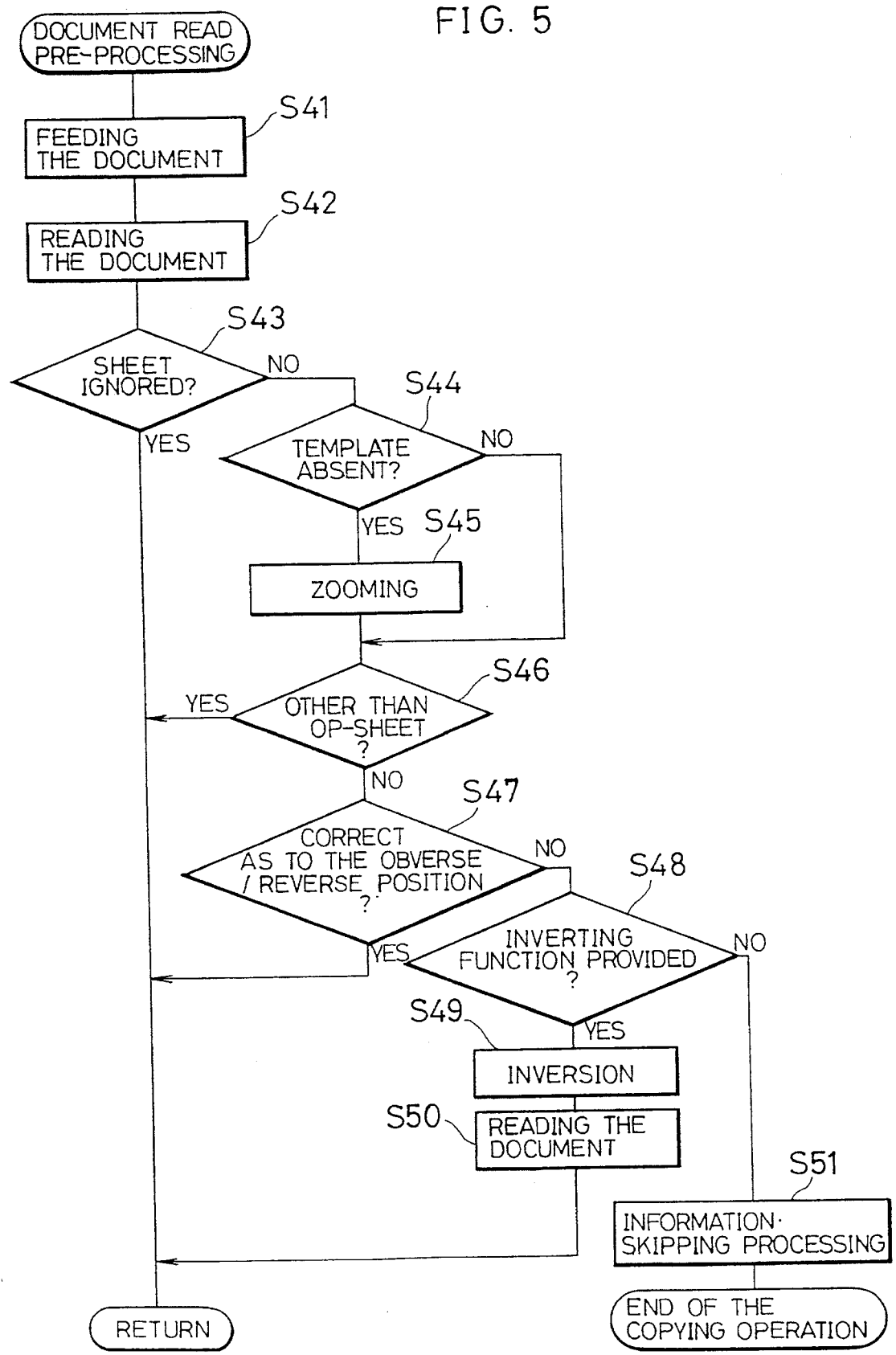
FIG. 5 is a flow chart of the detailed control procedure of a read pre-processing in the copying operation in FIG. 4.

When the start key 11 on the operation panel 9 is pressed, there is first executed a document read preprocessing shown at S21 in FIG. 4. As shown in FIG. 5, the document is fed from the ADF 1 to the document platen 6 (S41), and the document image is read by the scanner 7 (S42). Then, it is judged from the Op-sheet ignore flag Figno whether or not the Ignore OPS key 16 has been pressed before the start key 11 is pressed (S43). When a sheet ignoring setting has been made, this document read pre-processing is completed. Otherwise, it is then judged whether or not there is present, in the data ROM 33, the template of an operation setting paper sheet corresponding to the paper size of the read document (S44). In the negative, the template stored in the data ROM 33 is subjected to zooming of enlargement/reduction according to the paper size (S45).

Thereafter, the read document image is compared with the template. Based on the presence or absence of the identification marks 25, it is judged whether or not the read document is an Op-sheet 24 (S46). When the read document is not the Op-sheet 24, the document read pre-processing is executed. When the read document is the Op-sheet 24, it is then judged whether the Op-sheet 24 is placed properly as to the obverse/reverse relationship (S47). When the Op-sheet 24 is properly placed, the document read processing is finished. When the document has been placed with the wrong side up, it is then judged again whether or not the ADF 1 has the inverting function (S48).

When the ADF 1 has the obverse/reverse inverting function, the document is inverted using this function (S49). Thereafter, the document is again read (S50), and the document read pre-processing is then finished. When the ADF 1 is not provided with the inverting function, the copying operation is once stopped and there is executed a processing for informing the operator of the fact that the reverse side of the Op-sheet 24 has been read (S51). Then, the copying operation processing is finished.

Provision may be made at S51 such that, instead of the processing of informing the operator, there is executed the processing of (i) repeating the feed of documents from the ADF 1 until the next Op-sheet 24 is recognized and (ii) skipping these documents, or that both the processings above-mentioned are executed.

After the document read pre-processing abovementioned has been executed at S21 in FIG. 4, it is judged from the interrupt flag Fint whether or not the document read processing has been made in an interrupt mode (S22). In the negative, it is then successively judged again whether or not the read document is the Op-sheet 24 and whether or not the Ignore OPS key 16 has been pressed (S23, S24).

When the document is the Op-sheet 24 and the Ignore OPS key 16 has not been pressed, the read document is handled as an operation setting paper sheet for starting a job in a new operational mode. Then, if there is a previous job, such a previous job is regarded as having been finished and the operation of finishing the previous job is then executed (S25). The job finishing operation, for example, refers to the operation of executing a staple processing when the paper discharge unit 5 has a stapling function and a stapling instruction has been given in this job.

Thereafter, a variable setting processing is executed based on the read data from this Op-sheet 24 (S26).

Figure 6A:
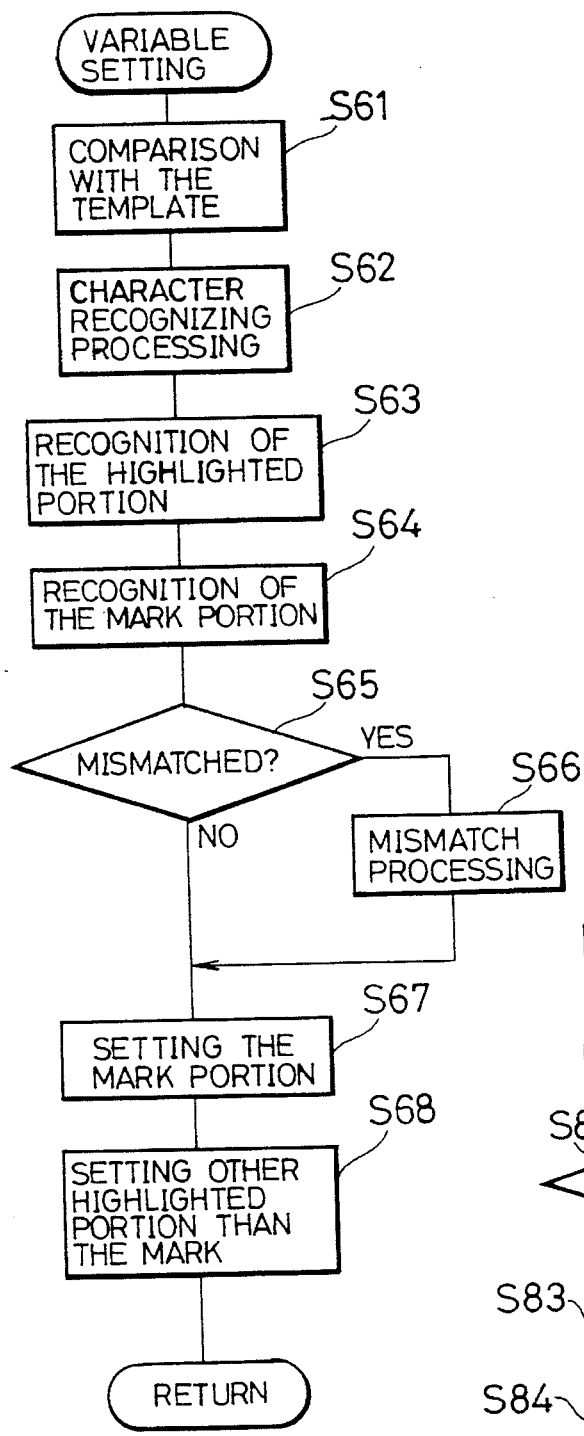
FIG. 6 (a) is a flow chart of the detailed control procedure of a variable setting processing in the copying operation in FIG. 4.
Figure 6B:
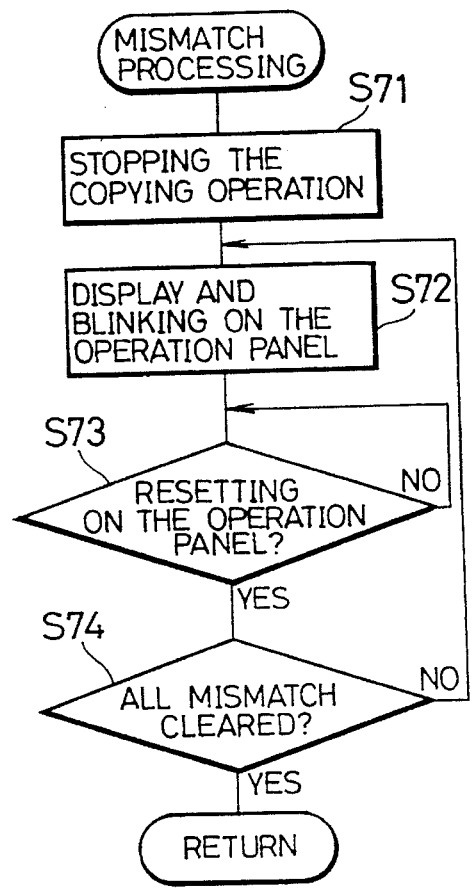
Figure 6C:
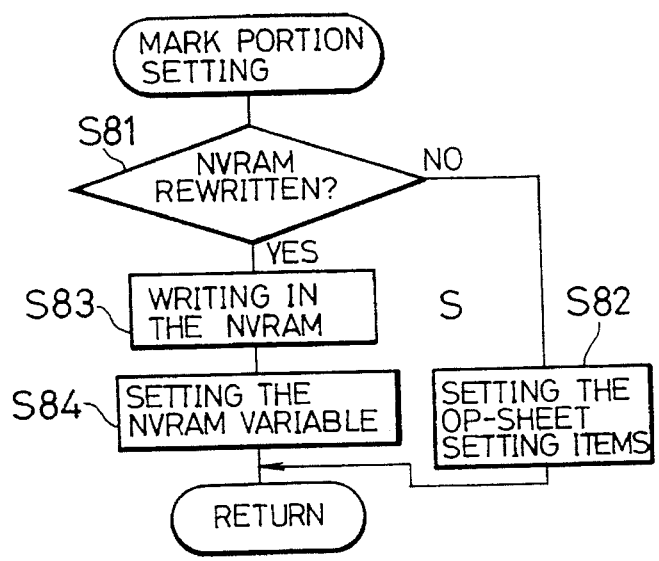

FIG. 6 (a) shows this variable setting processing in which the read image is first compared with the above-mentioned template (S61) and a character recognizing processing is then executed on a selection item such as the number of copies to which a numerical value is entered, thereby to read the entered numerical value (S62). Further, with the use of character recognizing technique and mark recognizing technique, there are recognized the highlighted items in selection items (S63) and the marks put in check areas 28 (S64).

Then, it is judged whether or not the settings are mismatched (S65). The term of mismatch refers to the case where marks which have been put in contradiction to one another, for example, two or more marks are put for the paper size.

When it is judged that there is a mismatch, a mismatch processing is executed (S66) and a mark portion setting processing is then executed (S67).

In the mismatch processing, as shown in FIG. 6 (b), a copying operation stop processing is executed (S71) and the mismatched items are displayed as blinking (S72). Then, the sequence is to wait for a resetting processing to be made on the operation panel 9 by the operator (S73). When the operator has made new settings for the mismatched items, it is then judged whether or not all the mismatches are cleared (S74). In the negative, there is repeated the processing of returning the sequence to S72. When there is provided the state where all the mismatches have been cleared, the mismatch processing is finished.

In the mark portion setting processing to be executed at S67 in FIG. 6 (a), as shown in FIG. 6 (c), it is first judged whether or not a check mark has been put on the mark area of the rewrite selection portion 29 in the Op-sheet 24 (S81). In the negative, the operational mode is set according to the contents of other setting items of the Op-sheet 24 on each of which a check mark has been put (S82). On the other hand, when a check mark has been put on the mark area of the rewrite selection portion 29, the new setting contents are written in the NVRAM 35 according to the contents of other setting items of the Op-sheet 24 on each of which a check mark has been put, thus changing the contents stored in the NVRAM 35 (S83). Then, all the setting contents of the NVRAM 35 which have been written, are read out to set the operational mode (S84). This not only sets the operational mode according to the marked items of the Op-sheet 24, but also changes the contents stored in the NVRAM 35.

When the mark portion setting processing is executed at S67 in FIG. 6 (a) after the mismatch processing has been executed as necessary, the operational mode is set according to the checked items which have been recognized at S62 and S64 and which have been checked by the operator. The items which have not been checked by the operator, are set according to the highlighted selection items recognized at S62 and S63 (S68). With the processings above-mentioned, the variables and the operational mode are set to complete the variable setting processing.

In the processing procedure above-mentioned, when there is finished, at S26 in FIG. 4, the variable setting processing according to the setting items of the Op-sheet 24, it is then made sure from the output of the ADF document detecting sensor 1c that a document to be copied has been placed on the ADF 1 (S27), and the sequence is then returned to S21.

Thus, the document read pre-processing causes the next document to be fed from the ADF 1 to the document platen 6.

At S23, it is judged that the document is not the Op-sheet 24, and the sequence then proceeds to the step of judging whether or not the document above-mentioned is other indication sheet than the operation setting paper sheet (S28). In the affirmative, the contents of the indication sheet are recognized (S29). According to the indication sheet, the variables and operations are set (S30), and the processing above-mentioned at S27 is then executed.

When it is Judged that the document is not an indication sheet and the document is therefore a normal document to be copied, the sequence proceeds to S31 where the read document image is copied according to the operational mode set at this point of time. Then, the sequence proceeds to S27 and a copying operation is repeated until the documents on the ADF 1 run out. Meanwhile, when a new Op-sheet 24 or indication sheet is fed from the ADF 1 to the document platen 6, the operational mode is changed to the contents set therein each time such an Op-sheet 24 or indication sheet is fed.

On the other hand, when it is judged at S23 that the document is an Op-sheet 24 and it is judged at S24 that the Ignore OPS key 16 has been pressed, the sequence proceeds to S31 from S24. Accordingly, the job finishing processing and the variable setting processing are not executed, and the Op-sheet 24 is regarded as a normal document and then copied as it is.

When it has been judged from the interrupt flag Fint at S22 that the interrupt key 13 has been operated, it is then judged whether or not the copying operation up to that time has been executed according to the contents set by the Op-sheet 24 (S32). In the affirmative, the contents set by the Op-sheet 24 are temporarily shunted into the shunting zone in the data RAM 34$b$ (S33). This shunting processing is not executed when it was judged at S32 that the copying operation up to that time had not been executed in the operational mode set by the Op-sheet 24.

Then, the operational mode is changed according to the contents stored in the NVRAM 35 (S34). According to the changed operational mode, a copying operation is made (S35) and the sequence then proceeds to S27 where a copying operation in the interrupt mode is repeated for all the pages.

Thus, when it is judged at S27 that the copying operation is finished for all the documents in the interrupt mode or in the operational mode set by the Op-sheet 24, it is then judged whether or not the hitherto copying operation has been executed in the interrupt mode (S36). In the negative, the operational mode is set according to the setting contents stored in the NVRAM 35 (S37). On the other hand, when the hitherto copying operation has been executed in the interrupt mode, the operational mode is set according to the setting contents temporarily shunted at S33 (S38), and the processing of copying operation is finished. Thus, upon completion of the copying operation in the operational mode set by the Op-sheet 24, the operational mode is again set according to the setting contents stored in the NVRAM 35 and the sequence is then to wait for the start of the next job.

When the operational mode set by the Op-sheet 24 is interrupted by the interrupt mode, the operational mode set by the Op-sheet 24 is again set when the operation in the interrupt mode is finished. Thus, when the start key 11 is then pressed, the copying operation is restarted for the interrupted documents in the same operational mode as that before the interruption.

As discussed in the foregoing, the first embodiment is arranged such that the operation setting image (template) is stored in the data ROM 33, and that the Op-sheet 24 is printed out according to the operation setting image. It is therefore possible to suitably provide, as the original free from a reduction in image quality and positional shift, an operation setting paper sheet having an image quality which is identical with that provided by the copying machine itself and with which the data can securely be read by the copying machine. This not only reduces the occurrence of reading errors, but also prevents erroneous operations more securely as compared with the conventional operation setting paper sheet used as repeatedly copied.

In the first embodiment, when printing out the Op-sheet 24 as above-mentioned, the predetermined default values or selection items corresponding to the current set values are printed out as highlighted by a bold style, an underline, a decoration such as a shade or the like, change in font to an italic style or the like, an addition of a special character representing a high-light, coloring of an mark area or the like. When setting the variables and operations by the Op-sheet 24, such selection items drawn as highlighted in the Op-sheet 24 are set for the selection items which have not been marked in the Op-sheet 24 by the operator.

It is therefore possible to immediately judge how a selection item is to be set if such a selection item has not been set by the operator. This prevents a copying operation from being executed in an operational mode contrary to expectations of the operator, thus reducing the occurrence of an erroneous operation. Further, merely by selecting an Op-sheet 24 in which a combination of the desired selection items has been drawn as highlighted, and by causing such an Op-sheet 24 to be read, the operator can provide the desired settings with no entry made into the Op-sheet 24. This eliminates a troublesome entry processing, thus improving the maneuverability.

In the first embodiment, there is disposed the Ignore OPS key 16 for handling an Op-sheet 24 as a normal document. Accordingly, when preparing a variety of types of Op-sheets 24 in which different selection items are drawn as highlighted, the Op-sheet can be copied as handled as a normal document. This also improves the general working efficiency.

Further, the first embodiment is arranged such that the Op-sheet 24 is supplied with an unavailable selection item printed as a blank or in grey for example such that such an item cannot be selected by the operator. This prevents the operator from setting unavailable data in vain, thus also reducing the occurrence of an erroneous operation.

Further, provision is made such that an Op-sheet 24 is printed out with the template of operation setting paper sheet in the data ROM 33 subjected to the processing of enlargement/reduction according to the desired paper size. This enables the memory for storing the template to be reduced in capacity.

Provision may also be made such that the data ROM 33 previously stores templates corresponding to the different paper sizes. It is therefore possible to supply an Op-sheet 24 in an optional size desired by the operator. This improves the maneuverability when setting the operational mode by an Op-sheet 24.

When an Op-sheet 24 is read, the read image is analyzed by comparing it with the previously stored template of operation setting paper sheet. At this time, when the Op-sheet 24 and the template are different in size from each other, the contents cannot correctly be read. Accordingly, the first embodiment is arranged such that the template of operation setting paper sheet stored in the data ROM 33 is subjected to zooming of enlargement/reduction according to the read Op-sheet 24. It is therefore possible to use an Op-sheet 24 of the desired size.

In such an arrangement, too, provision may be made such that the data ROM 33 previously stores templates corresponding to the different paper sizes. This enables the operational mode to be set using an Op-sheet 24 in the desired size. This reduces the restrictions to be imposed on the size of the Op-sheet 24. It is therefore possible to select an Op-sheet 24 according to the document size and place the Op-sheet 24 thus selected, together with the document, on the ADF 1 such that the operational mode can automatically be set to improve the maneuverability.

According to the first embodiment, it is judged whether or not the Op-sheet 24 is placed properly as to the obverse/ reverse relation thereof. In the negative, when the ADF 1 is provided with the inverting function, the Op-sheet 24 is automatically inverted, causing the same to be properly placed, and the Op-sheet 24 thus properly placed is then read. Accordingly, even though the Op-sheet 24 is erroneously placed by the operator, the correction can automatically be made. This prevents the occurrence of a copying operation contrary to expectations of the operator. This not only reduces the occurrence of an erroneous operation, but also improves the maneuverability and working efficiency of the copying machine.

For the ADF 1 provided with no inverting function, when it has been judged that the Op-sheet 24 is placed with the wrong side up, provision is made such that the copying operation is once stopped and the operator is informed of the fact that the Op-sheet 24 is placed with the wrong side up, or such that the subsequent documents are skipped until a new Op-sheet 24 is recognized or until all the documents on the ADF 1 run out. This prevents the documents from being copied in vain with undesired results.

According to the first embodiment, it is judged whether or not the Op-sheet 24 contains, in its variable settings, mismatched setting items contradictory to one another. When it is judged that the Op-sheet 24 contains mismatched items, the copying operation is once stopped and the mismatched items are displayed as blinking on the operation panel 9. The sequence waits until the mismatched items are corrected on the operation panel 9 by the operator. Then, when the contradiction is solved, the copying operation starts again. This prevents an undesired copying operation from being executed with the contradiction still remaining. Thus, copied images in the desired operational mode can securely be obtained.

On the other hand, the first embodiment is arranged such that the settings made by the operation panel 9 are stored in the NVRAM 35 and that the settings by the Op-sheet 24 and the actually used settings are stored in the RAM 34. Accordingly, when starting the interrupt mode or the like, the settings in the NVRAM 35 can immediately be accessed. Then, when the interrupt operation is finished, the sequence can immediately be returned to the mode set by the Op-sheet 24 and the copying operation in this operational mode can be started again. Further, the NVRAM 35 comprises a nonvolatile memory means. Accordingly, even though the power is turned off, the setting contents therein are held. Thus, by storing, in the NVRAM 35, the settings to be commonly used in jobs, the items to be newly set each time the power is turned on, are reduced in number to improve the maneuverability.

Further, the first embodiment is arranged such that the Op-sheet 24 has a selection item of whether or not the contents stored in the NVRAM 35 are to be rewritten, and that the contents of the NVRAM 35 can also be changed by the Op-sheet 24, other than by a key operation on the operation panel 9. It is therefore possible to flexibly cope with a change in setting item to be commonly used in jobs, for example a change in paper size from B5 to A4. This also improves maneuverability.

[SECOND EMBODIMENT]

Figure 12:
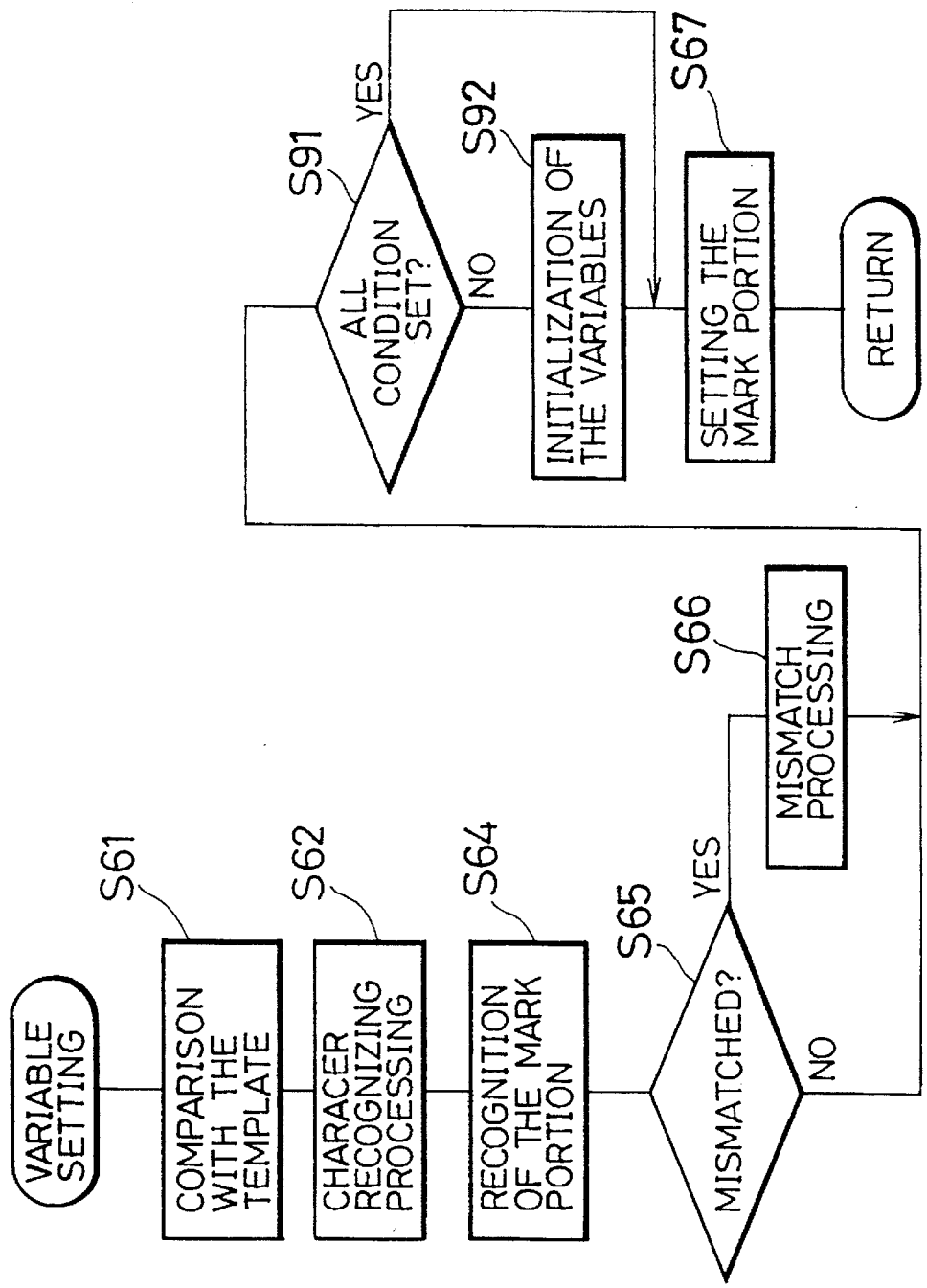
FIG. 12 is a flow chart of the control procedure of the variable setting processing in an image forming apparatus according to a second embodiment of the present invention.

The following description will discuss a second embodiment of the present invention with reference to FIG. 12. For convenience of the description, like parts having similar functions in the second embodiment are designated by like reference numerals used in the first embodiment, and the detailed description thereof is omitted. This also applies to third and fourth embodiments to be discussed later.

The arrangement of a digital copying machine according to the second embodiment is the same as that of the first embodiment, except for the arrangement of control of the variable setting processing discussed in connection with FIG. 6 (a) in the first embodiment.

The first embodiment is arranged such that a selection item drawn as highlighted is automatically set for the setting item for which no check mark has been entered on the Op-sheet 24 by the operator. However, the second embodiment is arranged such that a highlighted item is neither recognized nor set, but a predetermined default value is set.

As shown in FIG. 12, the read image is compared with the template (S61) and there are then executed a character recognizing processing (S62) and a mark portion recognizing processing (S64). Then, it is judged whether or not there is a mismatch (S65). In the affirmative, a mismatch processing is executed as done in the first embodiment (S66).

According to the second embodiment, it is then judged whether or not all the variables and operations have been set with the marks by the operator (S91). When there is an item which has not been set, the settings of all the variables and operations are initialized to the predetermined default values (S92). Thereafter, the marked setting items recognized at S62 and S64 are set as done in the first embodiment (S67), thus completing the variable setting processing.

When it has been judged at S91 that all the items were set and there was no room for setting, the sequence proceeds to S67 without the initializing processing at S92 executed. The second embodiment is arranged such that, when printing out an Op-sheet 24 based on the template stored in the data ROM 33, there are selected, as selection items to be drawn as highlighted, the items corresponding to the default values set as initialized, and that these items are invariable.

Thus, the second embodiment is arranged such that, in the processing of setting the variables and operations with the Op-sheet 24, the items set on the Op-sheet 24 by the operator are recognized, and only when there is an item which has not been set by the operator, all the variables and operations are initialized to the default value. Accordingly, the items which have not been set by the Op-sheet 24, are always set to the constant values. This securely prevents the occurrence of an operation contrary to expectations of the operator. Further, when all the setting items have been set, the initializing processing is not executed and all the setting items are set according to the Op-sheet 24. This eliminates the initializing processing to shorten the processing period of time.

[THIRD EMBODIMENT]

Figure 13:
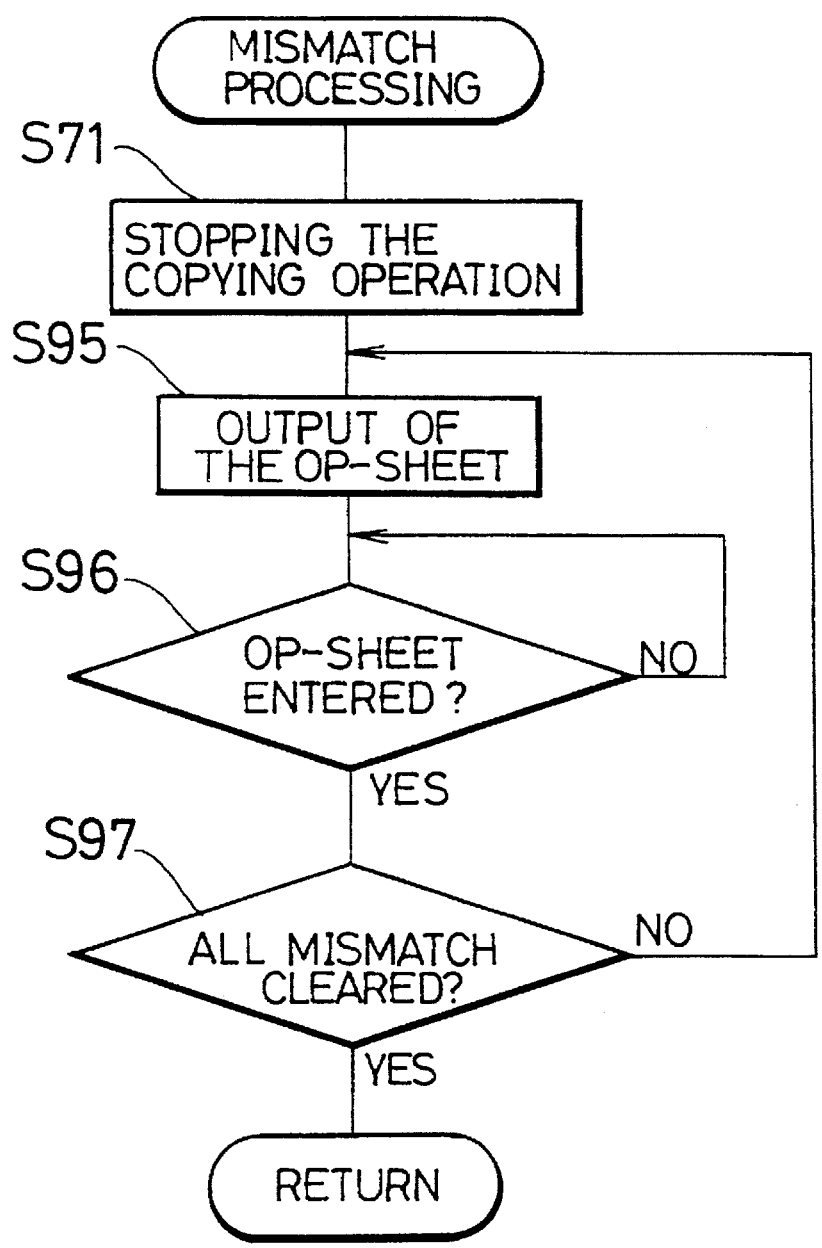
FIG. 13 is a flow chart of the control procedure of the mismatch processing in an image forming apparatus according to a third embodiment of the present invention.

The following description will discuss a third embodiment of the present invention with reference to FIG. 13.

The arrangement of a digital copying machine according to the third embodiment is the same as that of the first embodiment, except for the arrangement of control of the mismatch processing discussed in connection with FIG. 6 (b) in the first embodiment.

The first embodiment is arranged such that, when it has been judged that the settings on the Op-sheet 24 contain a mismatch, such mismatched settings are displayed as blinking on the operation panel 9 and the sequence is to wait for a resetting operation to be made by the operator. However, the third embodiment is arranged such that, in such a case, the sequence is to wait for entry from the Op-sheet 24.

More specifically, when it has been detected that the settings of the Op-sheet 24 contain a mismatch, there is first executed the processing of stopping the copying operation (S71) likewise in the first embodiment, and there is supplied an Op-sheet 24 in which the mismatched settings are drawn as high-lighted (S95), as shown in FIG. 13. Then, the sequence is to wait for an entry of an Op-sheet 24 (S96). Meanwhile, the operator executes a resetting processing on the Op-sheet 24 thus supplied. The Op-sheet 24 in which the resetting processing has been executed, is replaced with the Op-sheet 24 currently present on the document platen 6, and the start key 11 is then pressed. This causes the sequence to proceed from S96 to S97. At S97, it is judged as to the settings on the newly read Op-sheet 24 whether or not all the mismatched settings have been cleared. In the affirmative, the mismatch processing is finished. In the negative, the sequence is returned to S95 where there is supplied an Op-sheet 24 in which mismatched settings are drawn as highlighted. This processing is repeated until all the mismatched settings are cleared.

As thus discussed, according to the third embodiment, when the settings of the Op-sheet 24 contain a mismatch, there is supplied an Op-sheet 24 in which such a mismatch has been drawn as highlighted. This enables the operator to immediately recognize the mismatched settings. Accordingly, a correcting processing is immediately urged, thus preventing an erroneous operation.

[FOURTH EMBODIMENT]

The following description will discuss a fourth embodiment of the present invention with reference to FIG. 14.

Each of the embodiments above-mentioned is arranged such that an Op-sheet 24 is placed together with other documents on the ADF 1, and that the operational mode is changed according to the setting items of the Op-sheet 24 when the Op-sheet 24 is read after fed to the document platen 6 from the ADF 1. When the number of documents on the ADF 1 is large and it takes long time before the copying operation is completed, the operator often leaves the copying machine immediately after the start key 11 has been pressed. This involves the likelihood that, if the above-mentioned mismatch has been detected in the settings of the Op-sheet 24 read in the meantime, the copying machine is left as stopped.

In view of the foregoing, the fourth embodiment is arranged such that an operational mode can be set by an Op-sheet 24 immediately before the start key 11 is pressed. In the fourth embodiment, it is premised that the operator places, on the document platen 6, an Op-sheet 24 independently from the documents to be placed on the ADF 1. Further, it is assumed that there is executed, in the same manner as done in the first embodiment, the control operation to be made when each of the interrupt key 13, the OPS key 15 and the Ignore OPS key 16 is pressed. Accordingly, the description of such an operation is omitted in the following description.

As shown in FIG. 14, when the power is turned on in this copying machine, the initializing processing is made as done in each of the embodiments above-mentioned, and an Op-mode flag (hereinafter referred to as flag) F is set to "0" (S101). When the sequence proceeds to the step ready for a copying operation, it is judged whether or not any of the keys on the operation panel 9 has been pressed (S102). In the negative, the ADF opening/closing sensor 2b is checked (S103). When the sensor 2b is turned on, i.e., the ADF 1 is closed, it is judged whether or not the flag F is set to "0" (S104). In the affirmative, the ADF document detecting sensor 1c of the ADF 1 is checked (S105). When the sensor 1c is turned off, i.e., the sequence is in the initial state where no document is placed on the ADF 1, the sequence is returned from S105 to S102. Thus, the processing from S102 to S105 is repeated.

Here, when a document is placed on the ADF 1, it is judged at S105 that the ADF document detecting sensor 1c has been turned on. Then, the document-to-be-read detecting sensor 2a is checked (S106). When the sensor 2a is turned off, i.e., no other document is placed on the document platen 6, the flag F is set to "1" (S107) and the sequence is returned to S102. Thereafter, the processing from S102 to S104 through S103 is to be executed. However, since the flag F is not set to "0", the processing of returning the sequence from S104 to S102 is repeated and the flag F is maintained as "1".

When executing an operation of placing an Op-sheet 24 on the document platen 6, the ADF 1 is opened. With this operation, it is detected at S103 that the ADF opening/closing sensor 2b is turned off, the flag F is set to "0" at S108, and the sequence is returned to S102. When the ADF 1 is again closed after the Op-sheet 24 has been placed on the document platen 6, the processing from S103 to S106 through S104 and S105 is executed. At S106, it is detected that the document-to-be-read detecting sensor 2a is turned on.

Then, the document on the document platen 6 is read (S109). Then, it is judged whether or not the read document is an Op-sheet 24 (S110). When the document is the Op-sheet 24, there is executed a variable setting processing, as done in the first embodiment (See FIG. 6 (a)), according to the setting items of the Op-sheet 24 (S111). In this variable setting processing, when the settings of the Op-sheet 24 contain a mismatch, the mismatch processing mentioned earlier is executed and the operator is to make a correction.

When the variable setting processing according to the Op-sheet 24 is finished in the manner above-mentioned, the flag F is set to "3" (S112) and the sequence is returned to S102. Until a key operation is executed, the processing from S102 to S104 through S103, is to be executed. However, since the flag F is being set to "3", the processing of returning the sequence from S104 to S102 is repeated and the flag F is maintained at "3" in the state waiting for a key operation.

In the foregoing, the description has been made on the assumption that the operation of placing the Op-sheet 24 on the document platen 6 is executed after a document has been placed on the ADF 1. However, when the Op-sheet 24 is first placed on the document platen 6, the ADF 1 is then closed and a document is then placed on the ADF 1, the processing from S109 to S112 is executed at the time when it has been judged at S105 that the ADF document detecting sensor 1c has been turned on. Accordingly, the setting items on the Op-sheet 24 are set and "3" is set to the flag F to provide the state waiting for a key operation, as mentioned earlier.

When it has been judged at S110 that the document on the document platen 6 is not the Op-sheet 24, "2" is set to the flag F (S113) and the sequence is returned to S102. Then, the processing from S102 to S104 through S103 is repeated and the flag F is set to "2" to provide the state waiting for a key operation.

In each state waiting for a key operation, when it is judged at S102 that a key operation has been executed, it is then judged whether or not the operated key is the start key 11 (S114). When the operated key is other key than the start key 11, setting is made according to the operated key (S115) and the sequence is then returned to S102.

On the other hand, when it is judged at S114 that the operated key is the start key 11, it is then judged whether or not the flag F is set to "3" (S116). When the flag F is being set to "3", i.e., the start key 11 has been pressed with the Op-sheet 24 present on the document platen 6, the ADF 1 is caused to execute the processing of discharging the Op-sheet 24 from the document platen 6 to the document discharge tray 1b (S117). Then, one document is fed from the ADF 1 (S118) and a copying operation is executed (S119). Then, until the ADF document detecting sensor 1c detects that all the documents on the ADF 1 have run out (S120), the operations from S118 to S120 are repeated thereby to repeat a copying operation for all the documents on the ADF 1, and the sequence is then returned to S102.

When it has been judged at S116 that the flag F was not set to "3", it is then judged whether or not the flag F is set to "1" (S121). The state where the flag F is being set to "1", means that the start key 11 has been pressed with a document placed on the ADF 1 and no Op-sheet 24 placed on the document platen 6. At this time, the processing of discharging the Op-sheet 24 at S117 is not required. Accordingly, the sequence proceeds to S118 where a copying operation on the document on the ADF 1 starts.

On the other hand, the state where the flag F is neither being set to "1" but is being set to "2" at S121, means that the start key 11 has been pressed with other paper sheet than the Op-sheet 24 placed on the document platen 6. Further, the state where the flag F is being set to "0" means that the start key 11 has been pressed with no document placed on the ADF 1. In these two cases, a copying operation is executed only on the document on the document platen 6 (S122) and the sequence is returned to S102.

As discussed in the foregoing, the fourth embodiment is arranged such that the setting items on the Op-sheet 24 are automatically set when it is detected that the Op-sheet 24 is placed on the document platen 6 and that the ADF 1 on which a document is placed, is closed. Accordingly, the operational mode is not required to be manually set likewise in the first embodiment. This not only prevents an erroneous operation, but also saves the operational trouble. When the settings on the Op-sheet 24 contain a mismatch, such a mismatch is displayed before the start key 11 is pressed, i.e., while the operator is still found in the vicinity of the copying machine. This enables the operator to immediately make a correction. This prevents the copying machine from being left with the copying operation stopped.

Further, the operation panel 9 displays the settings by the Op-sheet 24 before the start key 11 is pressed. This enables the operator to check at that time whether or not the settings by the Op-sheet 24 are in accordance with the operator's expectations. This prevents an erroneous operation more securely.

Further, the fourth embodiment is arranged such that, when the start key 11 is pressed after the operational mode has been set according to the Op-sheet 24, the processing of discharging the Op-sheet 24 from the document platen 6 is automatically executed, and a copying operation for the document is then executed. This eliminates the labor of removing the operation setting paper sheet. This saves the operational trouble.

Further, the fourth embodiment is arranged such that the operational mode can be set by the Op-sheet 24 with the Op-sheet 24 placed on the document platen 6 independently from the document placed on the ADF 1. Accordingly, the Op-sheet 24 different in size from the document may be used. Accordingly, an Op-sheet 24 in an optional size can be used with no restrictions imposed by the document size. This improves the maneuverability.

In each of the embodiments above-mentioned, the description has been made on a digital copying machine to which the present invention is applied. However, the present invention may be applied to an image forming apparatus such as a facsimile, a page printer, or the like which has, together with document reading means, the function of printing a document image on a paper sheet, or other image forming apparatus in which two or more of the machines above-mentioned are being combined.

The specific mode and embodiments discussed in the Detailed Description of the Invention are to be considered in all respects as illustrative for clarifying the technical contents of the present invention. Therefore, the present invention is not to be construed in a restricted sense as limited to these specific embodiments. The present invention may be embodied as modified in a variety of manners within the spirit thereof and the scope of the appended claims.

What is claimed is:

1. An image forming apparatus comprising:

reading means for reading an image of a document placed on a document platen;

image forming means for forming an image based on the image of the document read by said reading means, said image thus formed being supplied as printed;

image memory means for storing an operation setting image;

operational mode setting means arranged such that when an operation setting paper sheet having an operation setting image printed thereon is placed on said document platen, an operational mode for said image forming means is set according to selection items to which selection marks have been put in said operation setting image read by said reading means from said operation setting paper sheet; and operation setting paper output control means for controlling said image forming means so as to supply said operation setting image read from said image memory means as printed upon receiving an instruction from an operation panel, said operation setting paper output control means including highlighting processing control means for preparing an operation setting image to be outputted by executing a high-light drawing processing on a specific selection item in said operation setting image read from said image memory means so as to distinguish said specific selection item from other selection items.

2. The image forming apparatus according to claim 1, wherein:

said highlighting processing control means draws characters of each selection item subjected to said high-light drawing processing in thicker characters than characters of other selection items.

3. The image forming apparatus according to claim 1, wherein:

said highlighting processing control means underlines only characters of each selection item subjected to said high-light drawing processing.

4. The image forming apparatus according to claim 1, wherein:

said highlighting processing control means changes only characters of each selection item subjected to said high-light drawing processing into an italic style.

5. The image forming apparatus according to claim 1, wherein:

said highlighting processing control means shades characters of each selection item subjected to said high-light drawing processing.

6. The image forming apparatus according to claim 1, wherein:

said highlighting processing control means describes characters of each selection item subjected to said high-light drawing processing in different style from characters of other selection items.

7. The image forming apparatus according to claim 1, wherein:

said highlighting processing control means adds a special character to characters of each selection item subjected to said high-light drawing processing.

8. The image forming apparatus according to claim 1, wherein:

said highlighting processing control means colors only a check area of each selection item subjected to said high-light drawing processing among check areas respectively formed for the selection items.

9. The image forming apparatus according to claim 1, wherein:

said highlighting processing control means controls such that each selection item which becomes unavailable due to some situation of said image forming means is printed in different color from other selection items.

10. The image forming apparatus according to claim 1, wherein:

said highlighting processing control means controls such that each selection item which becomes unavailable due to some situation of said image forming means is not printed.

11. The image forming apparatus according to claim 1, wherein:

when using an operation setting paper sheet having applied thereto a high-light drawing processing with respect to selection items having no selection marks put thereon by said highlighting processing control means as printed by said operation setting paper output control means, said operational mode setting means sets operational modes according to the selection items having applied thereto the high-light drawing processing.

12. The image forming apparatus according to claim 1, wherein:

said operation setting paper output control means includes mismatch processing means, and when a mismatch which makes it impossible to set an operational mode is detected among selection marks in said operation setting image read by said reading means, said mismatch processing means controls said highlighting processing control means so as to perform said high-light drawing processing on the selection items subject to said mismatch.

13. An image forming apparatus comprising:

reading means for reading an image on a document placed on a document platen;

image forming means for forming an image based on the image on the document read by said reading means, said image thus formed being supplied as printed;

image memory means for storing an operation setting image;

operational mode setting means for setting an operational mode of said image forming means according to selection items to which selection marks have been put in said operation setting image read by said reading means from said operation setting paper sheet when the operation setting sheet having the operation setting image printed thereon is placed on said document platen, said operational mode setting means further designating the operation setting sheet placed on said document platen as a normal document upon receiving an instruction from an operation panel; and operation setting paper output control means for controlling said image forming means so as to produce a copy output of the operation setting image read from said image memory means upon receiving an instruction from the operation panel.

14. An image forming apparatus comprising:

reading means for reading an image of a document placed on a document platen;

image forming means for forming an image based on the image of the document read by said reading means, said image thus formed being supplied as printed;

image memory means for storing an operation setting image;

operational mode setting means arranged such that when an operation setting paper sheet having an operation setting image printed thereon is placed on said document platen, an operational mode for said image forming means is set according to selection items to which selection marks have been put in said operation setting image read by said reading means from said operation setting paper sheet; and operation setting paper output control means for controlling said image forming means so as to produce a print output of said operation setting image read from said image memory means that is magnified or reduced according to a designated paper size.

15. An image forming apparatus comprising:

reading means for reading an image of a document placed on a document platen;

image forming means for forming an image based on the image of the document read by said reading means, said image thus formed being supplied as printed;

image memory means for storing an operation setting image;

operational mode setting means for setting an operational mode of said image forming means according to selection item to which selection marks have been put in said operation setting image read by said reading means from said operation setting paper sheet when the operation setting sheet having the operation setting image printed thereon is placed on said document platen, said operational mode setting means being arranged so as to determine if the image read by said reading means is the operation setting image based on the operation setting image obtained by magnifying or reducing the operation setting image stored in said image memory means according to a size of the document subject to the image read by said reading means; and operation setting paper output control means for controlling said image forming means so as to produce a copy output of the operation setting image read from said image memory means upon receiving an instruction from an operation panel.

16. The image forming apparatus according to claim 15, further comprising:

reverting means for reversing a document placed on said document platen, wherein said operational mode setting means activates said reverting means when said read image that is determined as an operation setting image to be outputted is turned a wrong side out.

17. The image forming apparatus according to claim 15, wherein:

when said read image that is determined as an operation setting image to be outputted is turned a wrong side out, said operational mode setting means informs a user of this fact.

18. The image forming apparatus according to claim 15, wherein:

when said read image that is determined as an operation setting image to be outputted is turned a wrong side out, said operational mode setting means repeats a determination of the read image until a new operation setting image to be supplied is recognized.

19. The image forming apparatus comprising:

reading means for reading an image of a document placed on a document platen;

image forming means for forming an image based on the image of the document read by said reading means, said image thus formed being supplied as printed;

image memory means for storing plural kinds of operation setting images according to different paper sizes;

operational mode setting means arranged such that when an operation setting paper sheet having an operation setting image printed thereon is placed on said document platen, an operational mode for said image forming means is set according to selection items to which selection marks have been put in said operation setting image read by said reading means from said operation setting paper sheet; and operation setting paper output control means for controlling said image forming means so as to produce a print output of the operation setting image of a size corresponding to a specified sheet size among said plural operation setting images stored in said image memory means.

20. An image forming apparatus comprising:

reading means for reading an image of a document placed on a document platen;

image forming means for forming an image based on the image on the document read by said reading means, said image thus formed being supplied as printed;

image memory means for storing plural operation setting images according to different paper sizes;

operational mode setting means for setting an operational mode of said image forming means according to selection items to which selection marks have been put in said operation setting image read by said reading means from said operation setting paper sheet when the operation setting sheet having the operation setting image printed thereon is placed on said document platen, said operational mode setting means being arranged so as to determine if the image read by said reading means is the operation setting image based on the operation setting image of a same size as a size of the document subject to the read image by said reading means; and operation setting paper output control means for controlling said image forming means so as to produce a copy output of the operation setting image read from said image memory means upon receiving an instruction from an operation panel.

21. The image forming apparatus according to claim 20, further comprising:

reverting means for reversing a document placed on said document platen, wherein said operational mode setting means activates said reverting means when said read image that is determined as an operation setting image to be outputted is turned a wrong side out.

22. The image forming apparatus according to claim 20, wherein:

when said read image that is determined as an operation setting image to be outputted is turned a wrong side out, said operational mode setting means informs a user of this fact.

23. The image forming apparatus according to claim 20, wherein:

when said read image that is determined as an operation setting image to be outputted is turned a wrong side out, said operational mode setting means repeats a determination of the read image until a new operation setting image to be supplied is recognized.

24. An image forming apparatus comprising:

reading means for reading an image of a document placed on a document platen;

image forming means for forming an image based on the image on the document read by said reading means, said image thus formed being supplied as printed;

image memory means for storing an operation setting image;

operational mode setting means for setting an operational mode of said image forming means according to selection items to which selection marks have been put in said operation setting image read by said reading means from said operation setting paper sheet when the operation setting sheet having the operation setting image printed thereon is placed on said document platen, said operational mode setting means further informing a user when a mismatch which makes it impossible to set an operational mode is detected in selection marks in said operation setting image read by said reading means, and, when said mismatch is eliminated by the user, setting an operational mode again; and operation setting paper output control means for controlling said image forming means so as to produce a copy output of the operation setting image read from said image memory means upon receiving an instruction from an operation panel.

25. An image forming apparatus comprising:

reading means for reading an image of a document placed on a document platen;

image forming means for forming an image based on the image on the document read by said reading means, said image thus formed being supplied as printed;

image memory means for storing an operation setting image;

input means for entering the setting items of an operational mode;

setting memory means for storing set contents of the operational mode inputted from said input means;

temporary memory means for temporarily storing the set contents of the operational mode which is already effective;

operational mode setting means for setting the operational mode of said image forming means when the operation setting paper sheet having the operation setting image printed thereon is placed on said document platen, according to the selection times having selection marks put thereon in the operation setting image read by said reading means from the operation setting paper sheet, said operational mode setting means further storing the set contents of the operational mode in said temporary memory means and newly setting an operational mode according to the set contents stored in said setting memory means when an interruption of the image forming process occurs while the operational mode by the operation setting paper sheet is already effective; and operation setting paper output control means for controlling said image forming means so as to produce a copy output of the operation setting image read from said image memory means upon receiving an instruction from an operation panel.

26. The image forming apparatus according to claim 25, wherein:

said operational mode setting means restores upon completion of said interrupt image forming processing, the operational mode based on the set contents of the operational mode stored in said temporary memory means.

27. The image forming apparatus according to claim 25, wherein:

said setting memory means is composed of a non-volatile random access memory.

28. The image forming apparatus according to claim 25, wherein:

said operation setting image stored in said image memory means includes a selection item of whether or not the set contents stored in said setting memory means are to be rewritten.

29. An image forming apparatus comprising;

reading means for reading an image of a document placed on a document platen;

image forming means for forming an image based on the image of the document read by said reading means, said image thus formed being supplied as printed;

image memory means for storing an operation setting image;

input means for inputting setting items of an operational mode;

setting memory means for storing set contents of the operational mode inputted from said input means;

temporary memory means for temporarily storing the set contents of the operational mode which is already effective;

operational mode setting means for setting an operational mode of said image forming means according to selection item to which selection marks have been put in said operation setting image read by said reading means from said operation setting paper sheet when the operation setting sheet having the operation setting image printed thereon is placed on said document platen, said operational mode setting means further initializing in said operation setting image read from said image memory means, each selection item to be selected, other than the setting items which have already been set, to a default value set beforehand; and operation setting paper output control means for controlling said image forming means so as to produce a copy output of the operation setting image read from said image memory means upon receiving an instruction from an operation panel.

30. An image forming apparatus comprising:

document feed means for automatically feeding each document to a document platen;

reading means for reading an image of a document placed on said document platen;

image forming means for forming an image based on the image of the document read by said reading means, said image thus formed being supplied as printed;

image memory means for storing an operation setting image;

operational mode setting means for setting an operational mode of said image forming means according to selection item to which selection marks have been put in said operation setting image read by said reading means from said operation setting paper sheet when the operation setting sheet having the operation setting image printed thereon is placed on said document platen, said operational mode setting means being arranged such that when the document feeding means is to supply the document, the operational mode is based on the operation setting sheet on said document platen; and operation setting paper output control means for controlling said image forming means so as to produce a copy output of the operation setting image read from said image memory means upon receiving an instruction from an operation panel.

31. The image forming apparatus according to claim 30, wherein:

said operational mode setting means is arranged such that, when a mismatch which makes it impossible to set an operational mode is detected among selection marks in said operation setting image read by said reading means, said operational mode setting means informs a user of this fact before an instruction for activating said image forming means is given.

32. The image forming apparatus according to claim 30, further comprising:

discharge means for discharging the operation setting sheet placed on said document platen upon completing a setting of the operational mode by said operational mode setting means.

* * * * *

UNITED STATES PATENT AND TRADEMARK OFFICE
CERTIFICATE OF CORRECTION

PATENT NO. : 5,608,493
DATED : March 4, 1997
INVENTOR(S) : Tomoki TANAKA, et al.

It is certified that error appears in the above-indentified patent and that said Letters Patent is hereby corrected as shown below:

On the title page, item [54] and column 1, line 3:

After "READING" insert --AN--

Signed and Sealed this

Eighth Day of July, 1997

Attest:

BRUCE LEHMAN

*Attesting Officer*     *Commissioner of Patents and Trademarks*